(12) United States Patent
Gotlund et al.

(10) Patent No.: US 12,509,130 B2
(45) Date of Patent: Dec. 30, 2025

(54) POSITIONAL LOAD DOOR MONITORING SYSTEM

(71) Applicant: TTX Company, Chicago, IL (US)

(72) Inventors: Erik L. Gotlund, Green Oaks, IL (US); David P. Cannon, Chicago, IL (US); Michael E. Antonakakis, Colorado Springs, CO (US); Thomas M. Kingsley, Chicago, IL (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 18/203,447

(22) Filed: May 30, 2023

(65) Prior Publication Data

US 2023/0303138 A1 Sep. 28, 2023

Related U.S. Application Data

(63) Continuation of application No. 17/566,280, filed on Dec. 30, 2021, which is a continuation-in-part of application No. 17/154,793, filed on Jan. 21, 2021.

(60) Provisional application No. 63/133,010, filed on Dec. 31, 2020, provisional application No. 62/964,726, filed on Jan. 23, 2020.

(51) Int. Cl.
*B61L 15/00* (2006.01)
*B61L 25/02* (2006.01)
*B61L 27/40* (2022.01)
*B61L 27/57* (2022.01)

(52) U.S. Cl.
CPC ....... *B61L 15/0081* (2013.01); *B61L 15/0027* (2013.01); *B61L 15/0072* (2013.01); *B61L 27/40* (2022.01); *B61L 25/025* (2013.01)

(58) Field of Classification Search
CPC ............ B61L 15/0081; B61L 15/0027; B61L 15/0072; B61L 27/40; B61L 27/57; B61L 25/025
See application file for complete search history.

(56) References Cited

U.S. PATENT DOCUMENTS

| 6,311,109 | B1 | 10/2001 | Hawthorne et al. |
| 6,487,488 | B1 | 11/2002 | Peterson, Jr. et al. |
| 6,490,523 | B2 | 12/2002 | Doner |

(Continued)

FOREIGN PATENT DOCUMENTS

| CN | 106600951 A | 4/2017 |
| CN | 107615312 A | 1/2018 |

(Continued)

OTHER PUBLICATIONS

Apr. 4, 2022—(WO) International Search Report & Written Opinion—PCT/US21/065801.

(Continued)

*Primary Examiner* — Erin D Bishop
*Assistant Examiner* — Mahmoud M Kazimi
(74) *Attorney, Agent, or Firm* — Banner & Witcoff, Ltd.

(57) ABSTRACT

Systems, methods, and non-transitory machine-readable media for tracking the state of a rail car are disclosed. In one or more example embodiments, a device may use sensors such as a spring height sensor or a time of flight sensor to determine a status of a load car, which may be associated with a location. The system may determine a delivery event at the location. This data may be correlated with spring usage data.

20 Claims, 29 Drawing Sheets

(56) References Cited

U.S. PATENT DOCUMENTS

| | | |
|---|---|---|
| 6,622,067 B1 | 9/2003 | Lovelace, II et al. |
| 6,668,216 B2 | 12/2003 | Mays |
| 6,691,064 B2 | 2/2004 | Vroman |
| 6,837,550 B2 | 1/2005 | Dougherty et al. |
| 7,685,884 B2 | 3/2010 | Degutis et al. |
| 7,688,218 B2 | 3/2010 | LeFebvre et al. |
| 7,698,962 B2 | 4/2010 | LeFebvre et al. |
| 7,769,509 B2 | 8/2010 | Gaughan et al. |
| 8,045,962 B2 | 10/2011 | Schullian et al. |
| 8,234,917 B2 | 8/2012 | Burkhart et al. |
| 8,781,671 B2 | 7/2014 | Beck et al. |
| 8,812,175 B2 | 8/2014 | Baker |
| 8,874,304 B2 | 10/2014 | Friesen et al. |
| 8,924,117 B2 | 12/2014 | Kull |
| 9,020,667 B2 | 4/2015 | Haas et al. |
| 9,026,281 B2 | 5/2015 | Murphy et al. |
| 9,365,223 B2 | 6/2016 | Martin et al. |
| 9,403,517 B2 | 8/2016 | Kernwein et al. |
| 9,469,198 B2 | 10/2016 | Cooper et al. |
| 9,981,673 B2 | 5/2018 | Martin et al. |
| 10,081,377 B2 | 9/2018 | Shubs, Jr. et al. |
| 10,137,915 B2 | 11/2018 | LeFebvre et al. |
| 2003/0060938 A1 | 3/2003 | Duvall |
| 2006/0047419 A1 | 3/2006 | Diendorf et al. |
| 2009/0299550 A1 | 12/2009 | Baker |
| 2012/0046811 A1 | 2/2012 | Murphy et al. |
| 2013/0245880 A1 | 9/2013 | Mcquade |
| 2013/0342362 A1* | 12/2013 | Martin ............... B61L 15/0018 374/152 |
| 2014/0060979 A1 | 3/2014 | Martin et al. |
| 2014/0263895 A1 | 9/2014 | Dickenson et al. |
| 2015/0099461 A1 | 4/2015 | Holden et al. |
| 2015/0183445 A1* | 7/2015 | Gotlund ............... B61F 5/26 29/897.2 |
| 2015/0219487 A1* | 8/2015 | Maraini ............... G01G 19/042 177/136 |
| 2015/0232079 A1 | 8/2015 | Martin et al. |
| 2016/0082988 A1 | 3/2016 | Kurz |
| 2016/0272228 A1 | 9/2016 | LeFebvre et al. |
| 2016/0325767 A1 | 11/2016 | LeFebvre et al. |
| 2017/0084094 A1 | 3/2017 | Worden et al. |
| 2017/0210401 A1 | 7/2017 | Mian |
| 2017/0297595 A1 | 10/2017 | Ryan |
| 2017/0343377 A1 | 11/2017 | Holden et al. |
| 2018/0222504 A1* | 8/2018 | Birch ............... B61L 3/008 |
| 2020/0103269 A1* | 4/2020 | Bell ............... G01G 19/086 |
| 2021/0291883 A1 | 9/2021 | Gotlund et al. |
| 2022/0119021 A1 | 4/2022 | Gotlund et al. |
| 2023/0073987 A1* | 3/2023 | Spencer ............... G01G 23/002 |
| 2023/0171525 A1 | 6/2023 | Ramasundaram et al. |

FOREIGN PATENT DOCUMENTS

| | | | |
|---|---|---|---|
| CN | 110264580 A | 9/2019 | |
| EP | 1535418 B1 | 11/2007 | |
| EP | 2990294 A1 * | 3/2016 | ............. B61F 5/144 |
| EP | 4093648 A1 | 11/2022 | |
| EP | 4271602 A1 | 11/2023 | |
| KR | 20160000031 A | 1/2016 | |
| WO | 2021150908 A1 | 7/2021 | |
| WO | 2022147337 A1 | 7/2022 | |

OTHER PUBLICATIONS

Sawley K et al: "The effect of hollow-worn wheels on vehicle stability in straight track," Wear, Elsevier Sequoia, Luasanne, CH, vol. 258, No. 7-8, Mar. 1, 2005 (Mar. 1, 2005), pp. 1100-1108, XP004731843, ISSN: 0043-1648, DOI: 10.1016/J.WEAR.2004.03.058.
Nov. 23, 2022—(IN) Examination Report—App. No. 202247047658.
Mar. 17, 2023—(AU) Examination Report—App. No. 2021209920.
Aug. 8, 2023—(EP) Rules 161(1) and 162 EPC Communication—App 21841161.9.
Sep. 27, 2023—(CA) 1st Office Action—App 3,165,833.
Jul. 6, 2023—U.S. Non-Final Office Action—U.S. Appl. No. 17/154,793.
Apr. 15, 2024—(CN) Notice of Grant and Registration—App 202180023332.X.
Dec. 18, 2023—(CN) 1st Office Action—App 202180023332.X.
Dec. 13, 2023—U.S. Non-Final Office Action—U.S. Appl. No. 18/203,485.
Jan. 4, 2024—U.S. Final Office Action—U.S. Appl. No. 17/154,793.
Jul. 1, 2024—U.S. Final Office Action—U.S. Appl. No. 18/203,485.
May 7, 2024—U.S. Non-Final Office Action—U.S. Appl. No. 17/154,793.
Oct. 25, 2024—(CA) 1st Office Action—App 3,203,906.
Nov. 26, 2024—(WO) Int. Search Report & Written Opinion—App. No. PCT/US24/42797.
Sep. 4, 2025—(EP) Exam Report—App. No. 21707057.2.
Jul. 8, 2025—(CA) Notice of Allowance—App. No. 3,165,833.

\* cited by examiner

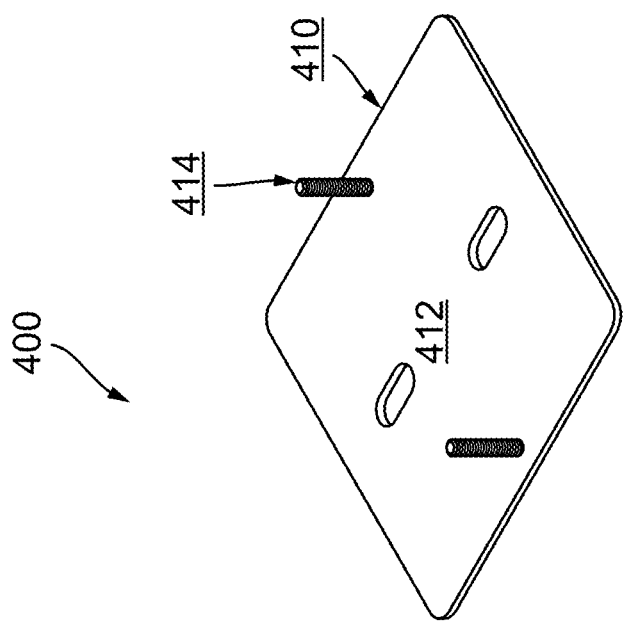
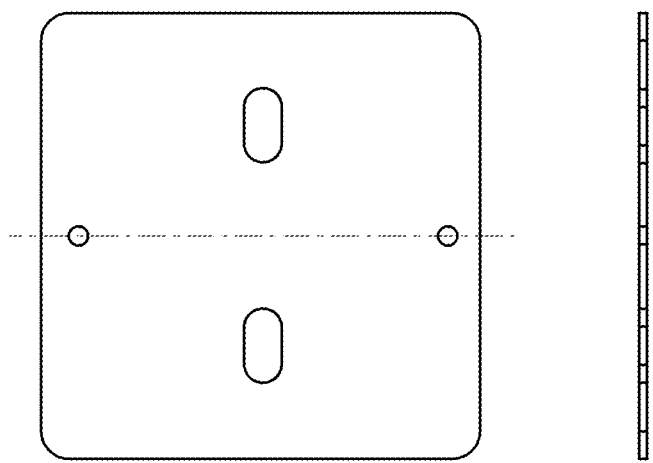
FIG. 4

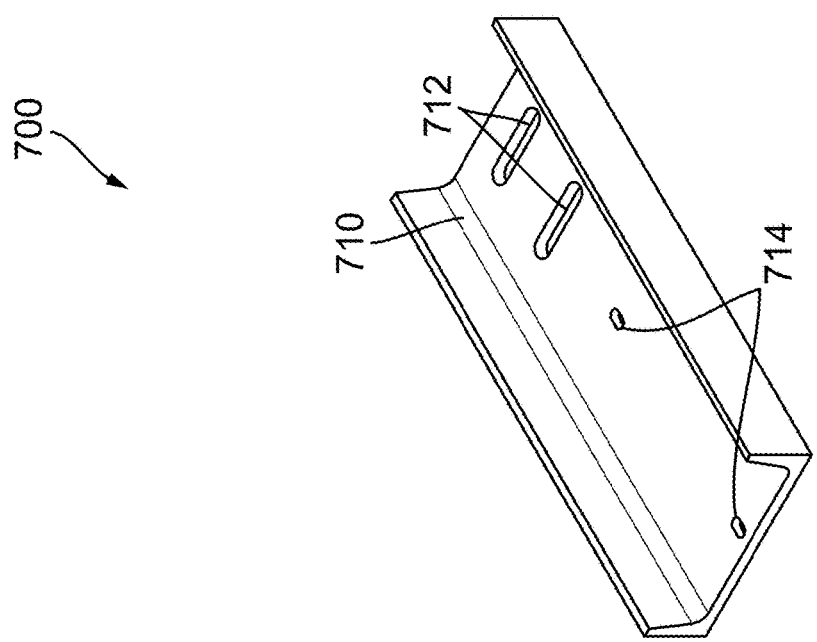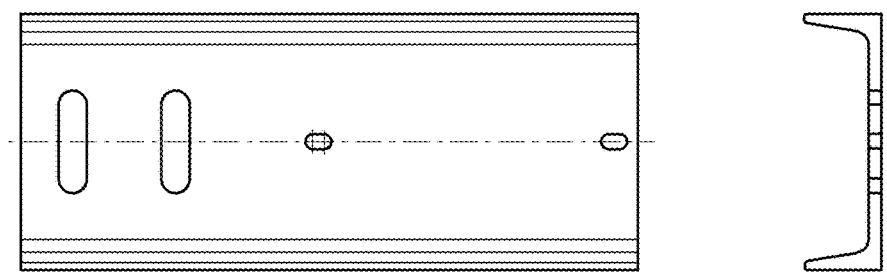
FIG. 7

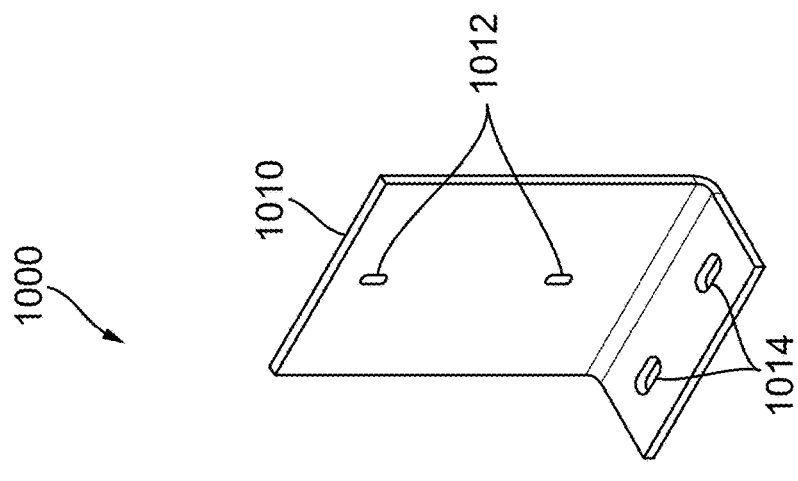
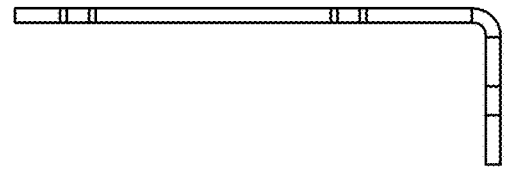
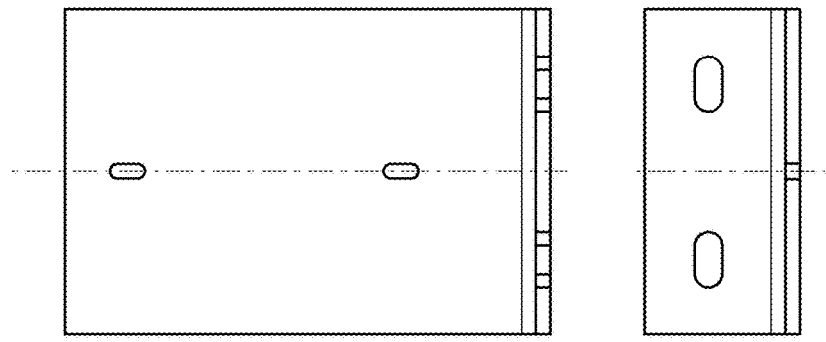
FIG. 10

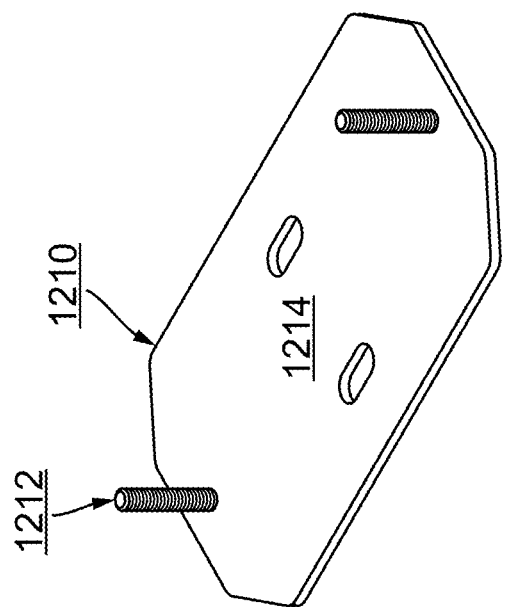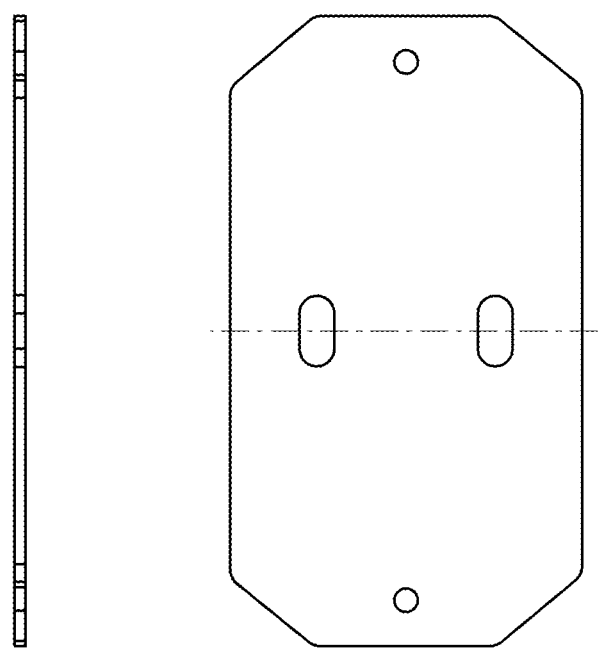
FIG. 12

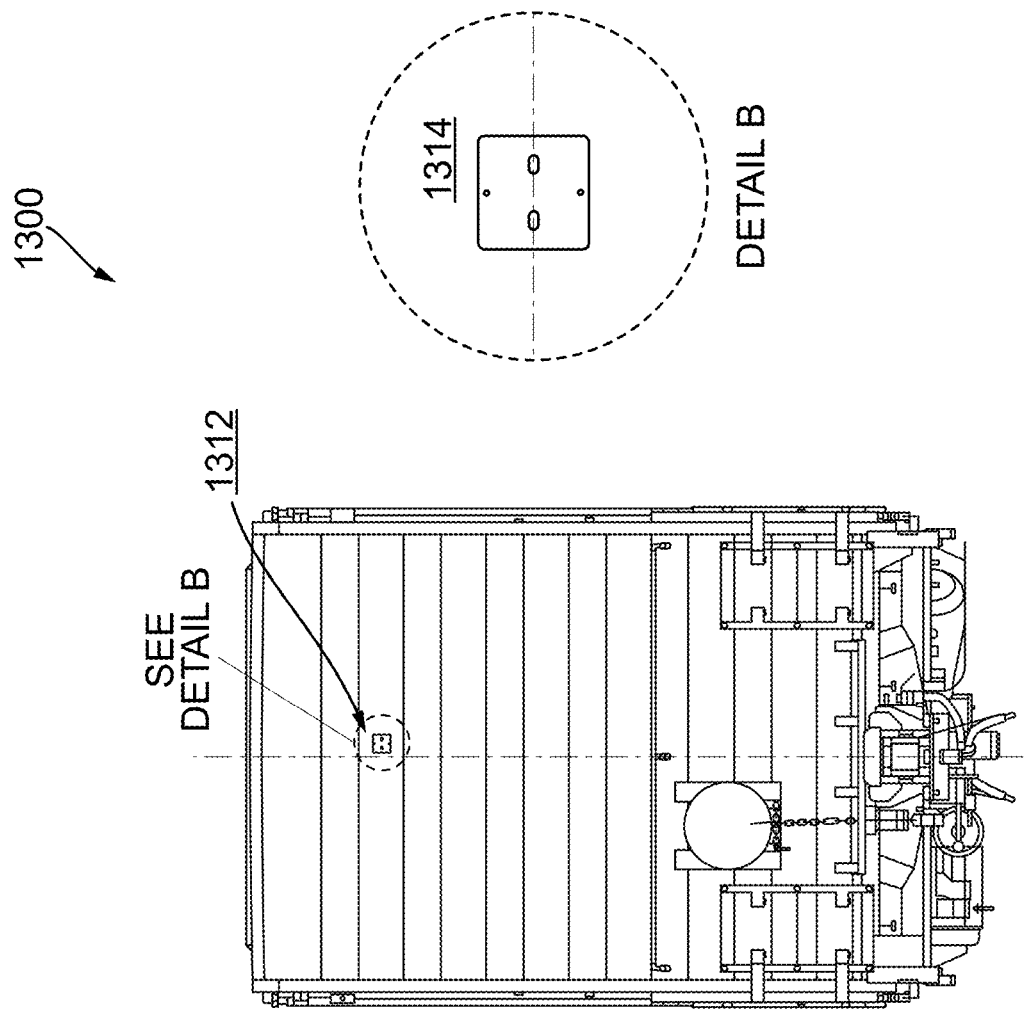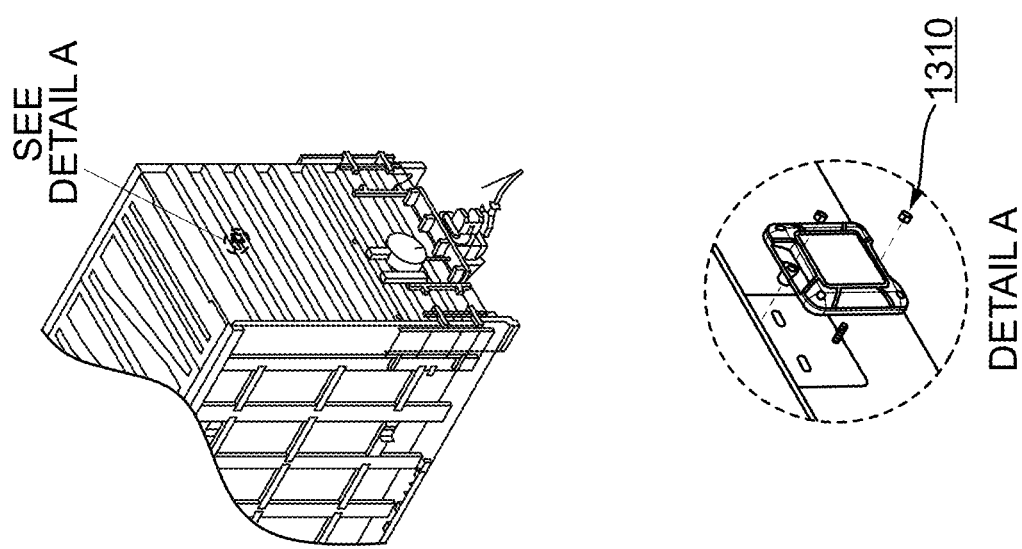
FIG. 13

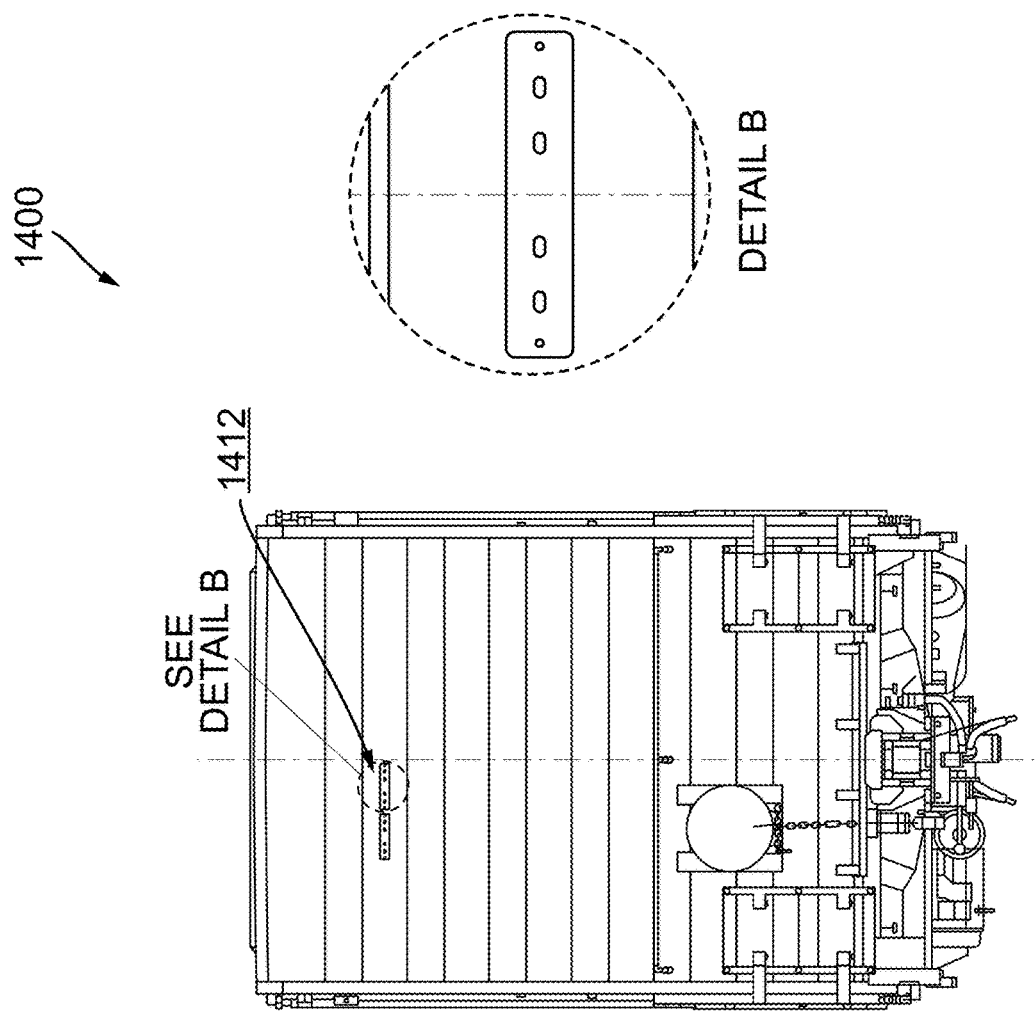
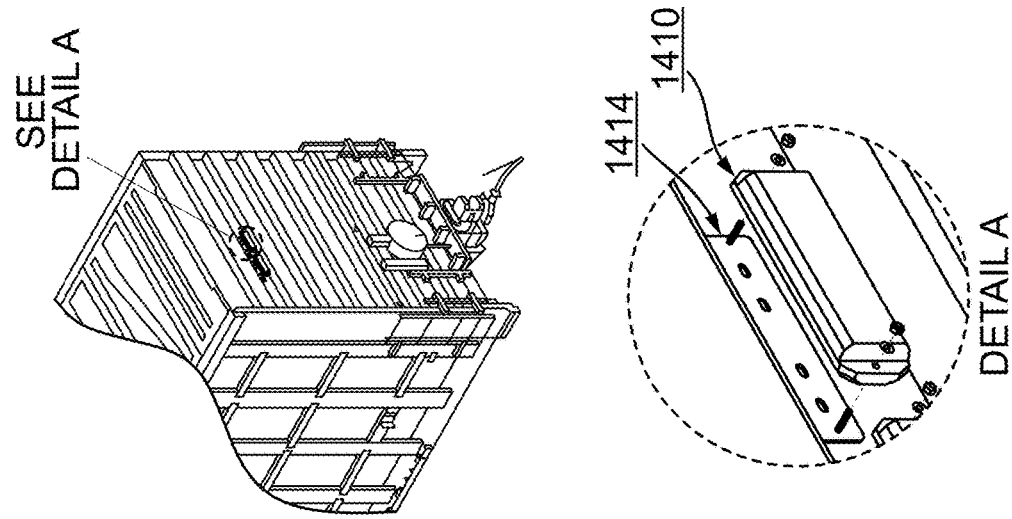
FIG. 14

| Building Data Array D | | | | | Updating Data Array D | | |
|---|---|---|---|---|---|---|---|
| Time | $t_{s,ref}$ | $t_{s,ref} + t_r$ | $t_{s,ref} + 2*t_r$ | ... | $t_{s,ref} + (n-2)*t_r$ | $t_{s,ref} + t_{ns}$ | $t_{s,ref} + n*t_r$ | $t_{s,ref} + (n+1)*t_r$ |
| Index | 0 | 1 | 2 | ... | n-2 | n-1 | 0 | 1 |
| Value | $\sigma_{y,0}$ | $\sigma_{y,1}$ | $\sigma_{y,2}$ | ... | $\sigma_{y(n-2)}$ | $\sigma_{y(n-1)}$ | $\sigma_{y,n}$ | $\sigma_{y(n+1)}$ |
| # full std-devs, $n_s$ | 0 | 0 | 0 | ... | 0 | 1 | 2 | 3 |

FIG. 21

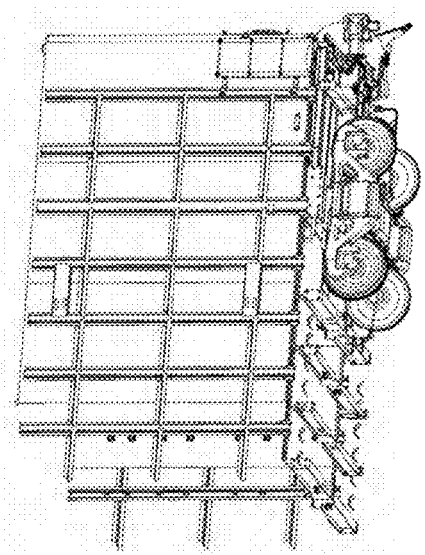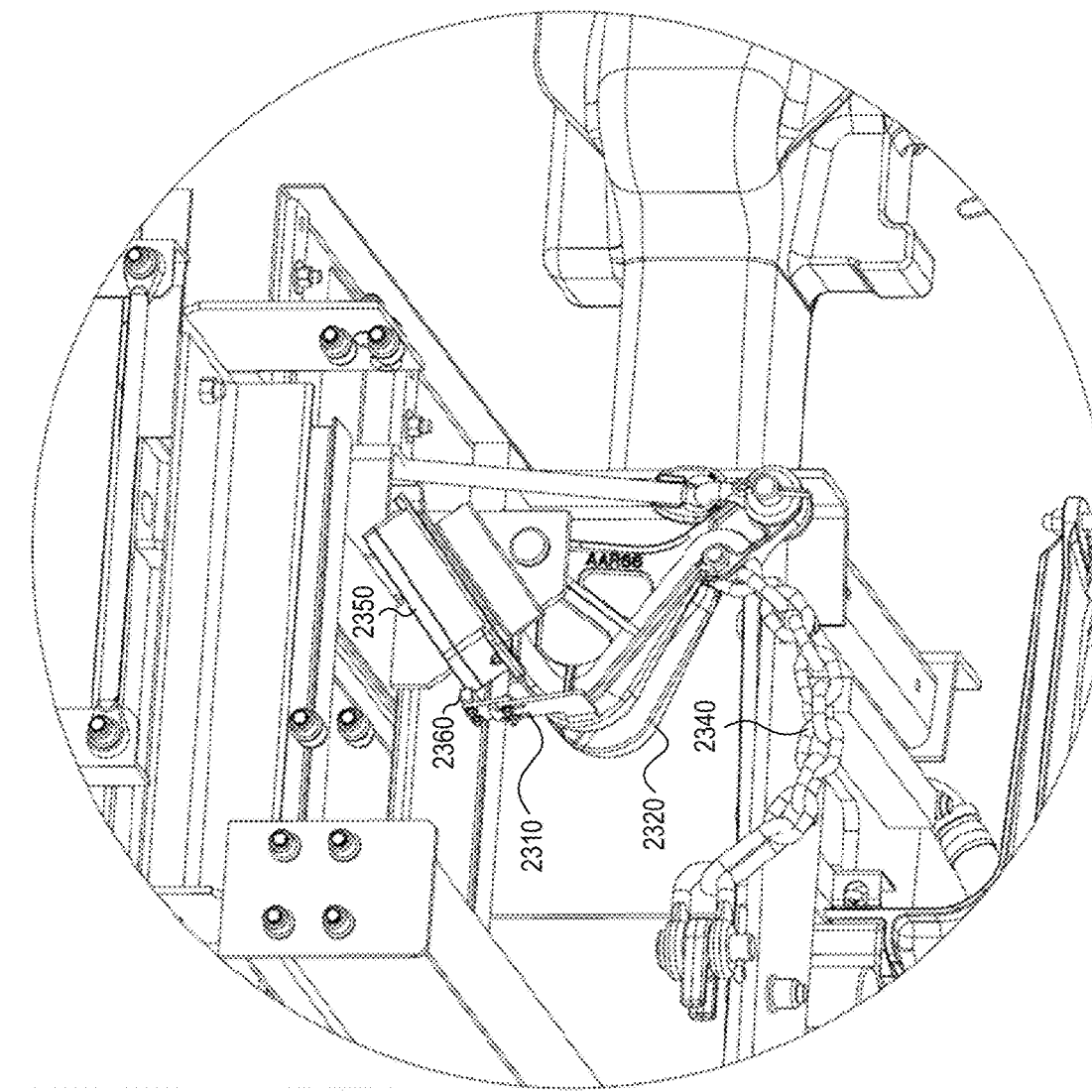
FIG. 23E

POSITIONAL LOAD DOOR MONITORING SYSTEM

CROSS-REFERENCE TO RELATED APPLICATIONS

The instant application claims priority to U.S. Provisional Patent Application No. 63/133,010, titled "Systems and Methods for Remote Monitoring" and filed Dec. 31, 2020, which is incorporated by reference herein in its entirety.

This application is a continuation of U.S. patent application Ser. No. 17/566,280, titled "Detecting a Hunting Condition of a Railcar Axle," and filed Dec. 30, 2021, which is also a continuation-in-part of U.S. patent application Ser. No. 17/154,793, titled "Systems and Methods for Verifying Railcar Location" and filed Jan. 21, 2021, which claims priority to U.S. Provisional Patent Application No. 62/964,726, titled "Systems and Methods for Remote Monitoring" and filed Jan. 23, 2020, each of which is incorporated by reference herein in its entirety.

TECHNICAL FIELD OF INVENTION

The present invention is generally related to data processing and more specifically the tracking and analysis of geographically distributed objects.

BACKGROUND

Rail transportation includes a variety of locomotive and railcars that travel throughout a rail system. These locomotives and cars require regular maintenance and repair to stay in service.

SUMMARY OF THE INVENTION

Systems, methods, and non-transitory machine-readable media for remote monitoring, such as detecting a hunting condition of a railcar axle, in accordance with embodiments of the invention are disclosed.

In one embodiment, a computer-implemented method for detecting a hunting condition of a railcar axle includes receiving acceleration data indicating lateral acceleration of a railcar from an accelerometer, determining multiple standard deviations of accelerometer readings based on the acceleration data, and providing an indication that an axle of the railcar is in a hunting condition based on at least one of the standard deviations of accelerometer readings satisfying a standard deviation threshold.

In one or more embodiments, the acceleration data received from the accelerometer is filtered using a low-pass filter.

In one or more embodiments, the acceleration data is stored in a data array as multiple accelerometer readings, a new accelerometer reading indicating lateral acceleration of the railcar is received from the accelerometer, and the oldest accelerometer reading stored in the data array is replaced with the new accelerometer reading based on the data array having no empty indices.

In one or more embodiments, summary data associated with movement of the railcar is provided, and the summary data includes one or more of an indication of a speed of the railcar, an indication of a latitude and a longitude of the railcar, an indication of an average of the standard deviations of accelerometer readings, an indication of a maximum standard deviation of the standard deviations of accelerometer readings, or an indication of a percentage of the standard deviations of accelerometer readings satisfying the standard deviation threshold.

In one or more embodiments, receiving the acceleration data is based on a speed of the railcar satisfying a speed threshold.

In one or more embodiments, one or more statistical summaries are determined for a portion of the standard deviations of accelerometer readings received during travel of the railcar over a predefined distance and based on the accelerometer experiencing an acceleration that satisfies an acceleration threshold.

In one or more embodiments, an interrupt signal is received from the accelerometer based on based on the accelerometer experiencing lateral acceleration that satisfies an acceleration threshold, a low-power mode is exited based on receiving the interrupt signal, and the low-power mode is entered after providing the indication that the railcar axle is in a hunting condition.

In one or more embodiments, the acceleration data indicates lateral acceleration of a body of the railcar at a location above a truck of the railcar.

In one or more embodiments, the indication that the railcar axle is in a hunting condition is provided by transmitting, via a wireless network, a message that includes the indication that the axle of the railcar is in a hunting condition.

In one or more embodiments, a reference frame of the accelerometer is reset after providing the indication that an axle of the railcar is in a hunting condition.

In another embodiment, a device for detecting a hunting condition of a railcar axle that includes a controller having one or more processors, a data array, an accelerometer, and memory storing executable instructions that, when executed by the one or more processors, cause the controller to obtain from an accelerometer acceleration data indicating lateral acceleration of a railcar, store the acceleration data in the data array, determine multiple standard deviations of accelerometer readings based on the acceleration data stored in the data array, and provide an indication that an axle of the railcar is in a hunting condition based on at least one of the standard deviations of accelerometer readings satisfying a standard deviation threshold.

In one or more embodiments, the device includes a low-pass filter configured to filter the acceleration data obtained from the accelerometer.

In one or more embodiments, the instructions stored in the memory of the device, when executed, also cause the controller to obtain from the accelerometer a new accelerometer reading indicating lateral acceleration of the railcar and replace the oldest accelerometer reading stored in the data array with the new accelerometer reading based on the data array having no empty indices.

In one or more embodiments, the instructions stored in the memory of the device, also cause the controller to provide summary data associated with movement of the railcar, and the summary data includes one or more of an indication of a speed of the railcar, an indication of a latitude and a longitude of the railcar, an indication of an average of the plurality of standard deviations of accelerometer readings, an indication of a maximum standard deviation of the plurality of standard deviations of accelerometer readings, or an indication of a percentage of the plurality of standard deviations of accelerometer readings satisfying the standard deviation threshold.

In one or more embodiments, the instructions stored in the memory of the device, also cause the controller to obtain the acceleration data based on a speed of the railcar satisfying a speed threshold.

In one or more embodiments, the instructions stored in the memory of the device, also cause the controller to determine, for a portion of the plurality of standard deviations of accelerometer readings received during travel of the railcar over a predefined distance, one or more statistical summaries based on the accelerometer experiencing an acceleration that satisfies an acceleration threshold.

In one or more embodiments, the accelerometer is configured to provide an interrupt signal to the controller based on the accelerometer experiencing lateral acceleration that satisfies an acceleration threshold, and the controller is configured to exit a low-power mode based on receiving the interrupt signal and enter the low-power mode after providing the indication that the axle of the railcar is in a hunting condition.

In one or more embodiments, the device is mounted, via a plate comprising a plurality of studs, to the railcar at a lateral centerline of the railcar and above a truck that carries the axle of the railcar.

In one or more embodiments, the instructions stored in the memory of the device, cause the controller to provide the indication that the axle of the railcar is in a hunting condition at least by causing transmission, via a wireless network, of a message comprising the indication that the axle of the railcar is in a hunting condition.

In one or more embodiments, the instructions stored in the memory of the device, cause the controller to reset a reference frame of the accelerometer after providing the indication that the axle of the railcar is in a hunting condition.

The above embodiments may also be implemented using a non-transitory machine-readable medium storing executable instructions that, when executed by one or more processors, cause a device to perform the steps of one or more of the above embodiments or otherwise disclosed herein.

Other objects, advantages and novel features, and further scope of applicability of the present invention can be set forth in part in the detailed description to follow, and in part can become apparent to those skilled in the art upon examination of the following, or can be learned by practice of the invention. The objects and advantages of the invention can be realized and attained by means of the instrumentalities and combinations particularly pointed out in the claims.

BRIEF DESCRIPTION OF THE DRAWINGS

The description can be more fully understood with reference to the following figures, which are presented as exemplary embodiments of the invention and should not be construed as a complete recitation of the scope of the invention, wherein:

FIGS. 3-8 are illustrations of a variety of bracket designs and mounting locations for remote monitoring devices to measure loading of an object in accordance with embodiments of the invention;

FIGS. 9-12 are illustrations of bracket designs and mounting locations for remote monitoring devices to measure door status in accordance with embodiments of the invention;

FIGS. 13-15 are illustrations of a variety of bracket designs and mounting locations for remote monitoring devices to measure location of an object in accordance with embodiments of the invention;

FIG. 21 is a table illustrating an example of a circular calculation of standard deviations for hunting detection in accordance with an embodiment of the invention;

FIGS. 23A-23E are illustrations of mounting locations for remote monitoring devices to measure handbrake status in accordance with embodiments of the invention.

DETAILED DESCRIPTION

Figure 1:
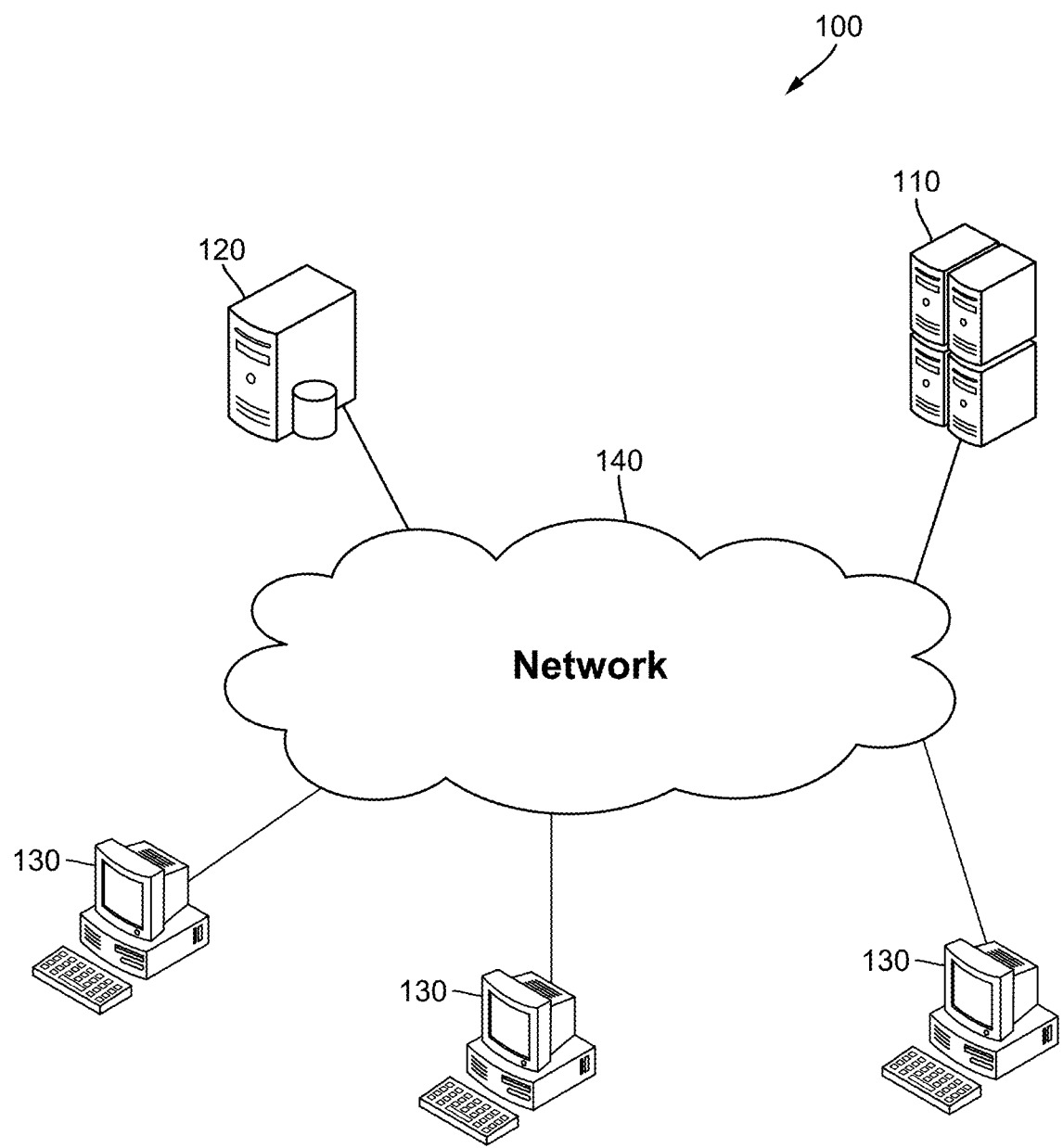
FIG. 1 is a conceptual illustration of a tracking system in accordance with an embodiment of the invention.

Turning now to the drawings, systems and methods for remote monitoring and tracking in accordance with embodiments of the invention are disclosed. The maintenance and repair of railcars (also "rail car"/"rail cars" or "car"/"cars") can include having services performed by one of a variety of geographically distributed service centers that is proximate to the railcar at the time the service is called for. Railcars can also include a variety of components, such as a flat and a rack, which are owned and/or maintained by different entities. For example, a flat (e.g. the wheels and underlying frame of the railcar) can be owned by a first entity while the rack (e.g. the portion of the railcar carrying cargo and attached to the underlying frame) is owned by a second entity. Additionally, sub-systems of the flat car may include truck systems, draft systems, air brake systems, and load securement equipment. In most cases, the flat cars and sub-systems of the flat car are unpowered components. Accordingly, there is a need to monitor the various components of the railcars and/or provide data to some or all of the entities regarding the status and location of the railcars.

Remote monitoring systems in accordance with embodiments of the invention can automatically obtain data regarding a variety of objects, such as railcars, and provide a unified interface for tracking and monitoring a variety of the objects. Portions of the railcar can be fitted with a variety of task tracking devices for monitoring the railcars and reporting the monitored condition of the railcars. In several embodiments, the remote monitoring devices are capable of individually obtaining and sending the data. In a variety of embodiments, a primary remote monitoring device can act as a central node that obtains data from a variety of slave remote monitoring devices. The primary remote monitoring device can process and/or transmit the data received from the slave monitoring devices. In a number of embodiments, the role of slave and primary remote monitoring device may rotate between the remote monitoring devices. This can allow for the more efficient use of resources, such as battery power, to prolong the operation of the remote monitoring system. The monitoring devices may communicate with a remote monitoring server system via a network connection, such as a cellular network. In many embodiments, the remote monitoring devices include a short-range communication device capable of communicating with nearby remote monitoring devices in a power-efficient manner. Short-range communications can be performed using any of a variety of techniques such as, but not limited to, Bluetooth, Bluetooth Low Energy, LoRa ("long range"), LoRaWAN, ZigBee, 802.15, 900 MHz, and/or other typical IoT ("Internet of Things") protocols.

Cellular data backhaul provides the benefit of widespread data coverage, but with moderate power usage while sending data. For this reason, the remote monitoring devices can be programmed to minimize power usage. Several strategies can be employed. Remote monitoring devices can use a low-power mode to decrease average power usage. Between sensor data collection and data transmission events, remote monitoring devices can enter a low-power mode, where modules (e.g. cell radio, Global Positioning System (GPS), sensors) are put into low-power standby modes or turned off completely. Cellular communication requires significant time for the device to connect to towers before sending data, representing significant overhead even for small messages. For a given cellular protocol, average power usage scales nearly linearly with the frequency of data transmissions, and is less sensitive to the size of transmissions. Therefore, the strategy used to control power usage and ensure long battery life involves limiting the frequency of data transmission. Transmission frequency for the remote monitoring devices can change based on device condition, e.g. car load status only changes while stationary, so it is checked and transmitted more frequently when the device is not moving. Considering that cell transmission frequency is a much more critical driver of power usage than individual message size, remote monitoring devices are programmed to collect data more frequently than they transmit data: For example, remote monitoring devices can check load status every hour, but only transmit the data every 12 hours in a single message containing all data from the previous 12 hours, saving power that would have been used on cellular overhead if sent each hour. In several embodiments, a status may be associated with a priority level and messages may be sent out based on the priority level. For example, if a load status associated with a high priority event is obtained by a remote monitoring device, the remote monitoring device may override a low-power operating mode and transmit the data immediately instead of on a 12-hour schedule.

Remote monitoring devices may include a variety of sensors for obtaining data regarding an object, such as a railcar and/or the remote monitoring device itself. The sensor data can include, but is not limited to, battery level, car location, car speed, altitude, GPS accuracy, environmental information, temperature, humidity, air pressure, distance measurements, force measurements, and/or time-of flight. Distance measurements can be used to determine door status, such as open or closed, and/or for monitoring car loading. Car loading can be determined by measuring the distance between any part of the sprung mass of the railcar and a fixed point vertically (such as the side frame, wheelset, rail, tie, ground, etc.). In several embodiments, Car loading can be calculated based on measured spring compression in the trucks by measuring distance from car body to side frame as the car body moves vertically in relation to side frame as load changes. Time of flight can be determined by emitting a laser beam towards the measured object (e.g. side frame) and measuring the amount of time that elapses before a reflection of the laser beam is detected by a laser collector. A self-contained array of laser collection sensors can be used to create a low-resolution image (e.g. 16×16), where each individual collector includes information on the intensity of the received laser reflection. This can improve the time of flight calculations by decreasing error and/or handling irregular target surfaces. Time of flight can also be determined using visible and/or infrared sensors. One or more LEDs can emit several short pulses of light towards the target surface and measures the amount of time that elapses before reflections of the light pulses are detected by a light collector. The emitted pulse pattern can be used to increase accuracy by ensuring the emitted and received pulses are properly time-synced/phased. In a variety of embodiments, distance may be measured using non-contact ultrasonic measurement transducers.

Remote Monitoring Systems

Remote monitoring systems in accordance with embodiments of the invention can obtain a variety of sensor data regarding objects and process that sensor data. A conceptual illustration of a remote monitoring system in accordance with an embodiment of the invention is shown in FIG. 1. The remote monitoring system 100 includes remote monitoring server system 110 connected to third-party database 120 and one or more remote monitoring devices 130 via network 140. In many embodiments, the remote monitoring server system 110 and/or third-party database 120 are implemented using a single server. In a variety of embodiments, remote monitoring server system 110 is implemented using a plurality of servers. In many embodiments, remote monitoring devices 130 are implemented utilizing remote monitoring server system 110. Network 140 can be one or more of a variety of networks, including, but not limited to, wide-area networks, local area networks, and/or the Internet as appropriate to the requirements of specific applications in accordance with embodiments of the invention.

In several embodiments, remote monitoring server system 110 can obtain and store a variety of data via third-party database 120. Third-party database 120 can obtain source data from any of a variety of sources and any of a variety of providers of source data as appropriate to the requirements of specific applications in accordance with embodiments of the invention. In a variety of embodiments, third-party database 120 includes one or more references (such as a uniform resource locator) to data that is stored in a distributed fashion. Remote monitoring server system 110 can obtain data regarding one or more objects from remote monitoring devices 130. Remote monitoring devices 130 can measure data regarding one or more objects and transmit the measured data to remote monitoring server system 110 and/or third-party database 120.

Remote monitoring systems in accordance with embodiments of the invention are described above with respect to FIG. 1; however, it should be appreciated that any of a number of variations can be utilized in accordance with embodiments of the invention. In several embodiments, remote monitoring server systems, databases, and/or remote monitoring devices provide an interface, such as an application programming interface (API) or web service, to transmit and receive some or all of the data to third-party systems for further processing. Access to the interface can be open and/or secured using any of a variety of techniques, such as by using client authorization keys, as appropriate to the requirements of specific applications of the invention.

Remote Monitoring Devices and Server Systems

Figure 2A:
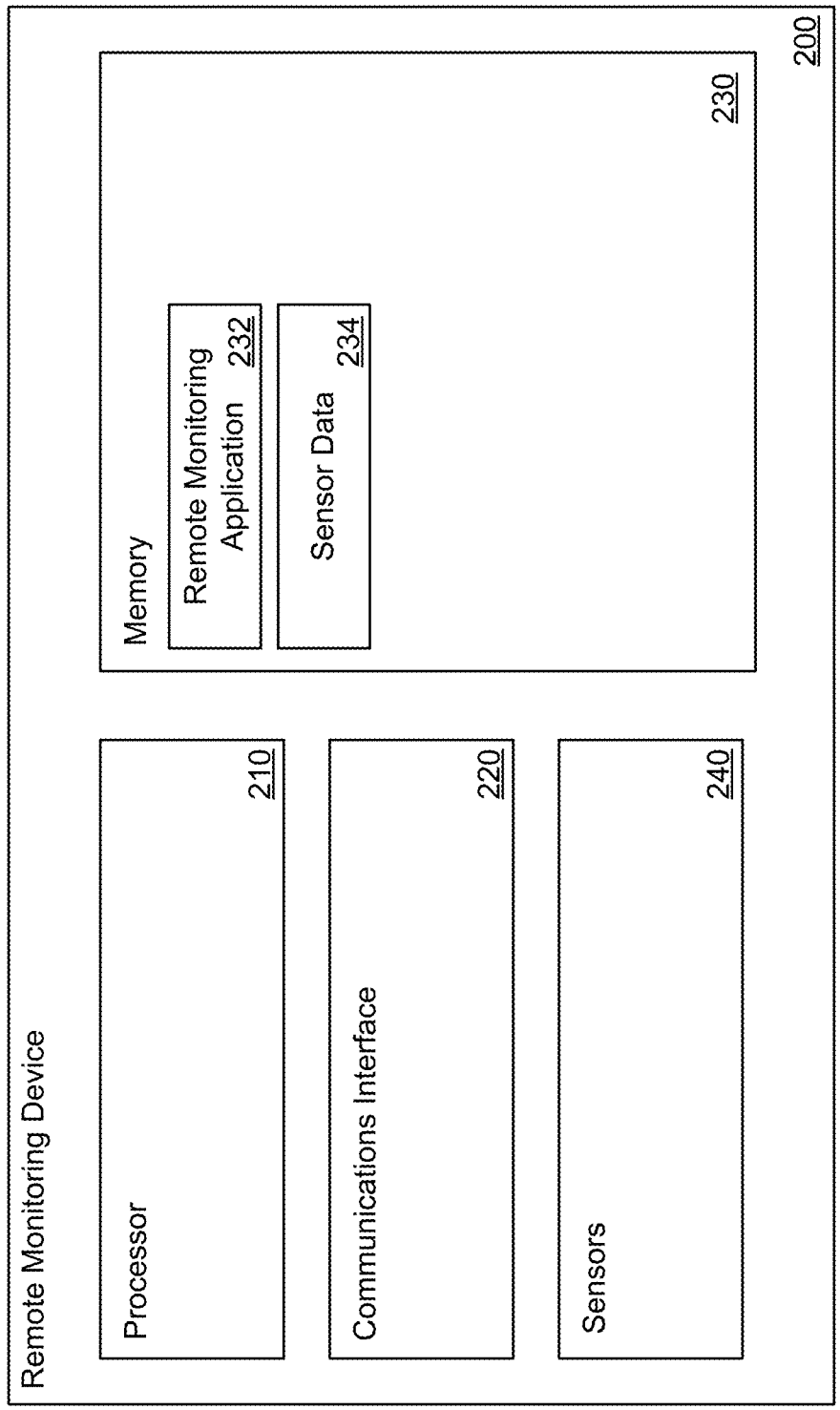
FIG. 2A is a conceptual illustration of tracking device in accordance with an embodiment of the invention.

Remote monitoring systems in accordance with embodiments of the invention include a variety of devices for monitoring a variety of geographically distributed objects. A conceptual illustration of a remote monitoring device in accordance with an embodiment of the invention is shown in FIG. 2A. The remote monitoring device 200 includes a processor 210 in communication with memory 230. The remote monitoring device 200 can also include one or more communication interfaces 220 capable of sending and receiving data and/or a variety of sensors 240 capable of measuring and obtaining a variety of data. In a number of embodiments, the communication interface 220 and/or sensors 240 is in communication with the processor 210 and/or the memory 230. In several embodiments, the memory 230 is any form of storage storing a variety of data, including, but not limited to, a remote monitoring application 232 and sensor data 234. In many embodiments, remote monitoring application 232 and/or sensor data 234 are stored using an external server system and received by the remote monitoring device 200 using the communications interface 220. Sensors 240 may include sensors for energy harvesting/recharging, location determination devices such as global positioning system (GPS) receivers, distance sensors, temperature sensors, humidity sensors, pressure sensors, force sensors, strain sensors, gyroscopes, accelerometers, and/or any other sensors for sensing particular sensor data as appropriate. The processor 210 can be directed, by the remote monitoring application 232, to perform a variety of remote monitoring processes described herein.

Figure 2B:
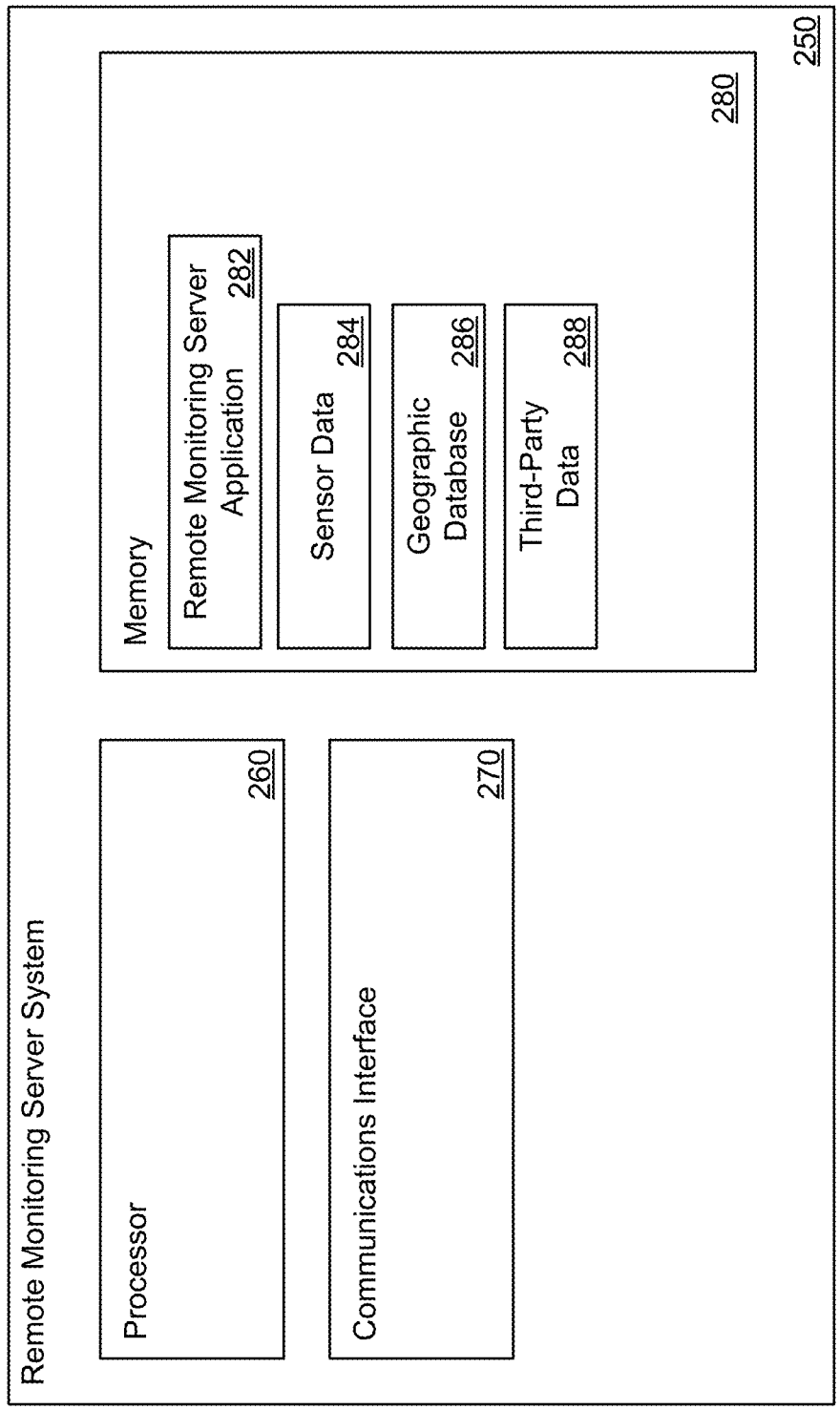
FIG. 2B is a conceptual illustration of a tracking server system in accordance with an embodiment of the invention.

A conceptual illustration of a remote monitoring server system in accordance with an embodiment of the invention is shown in FIG. 2B. The remote monitoring server system 250 includes a processor 260 in communication with memory 280. The remote monitoring server system 250 can also include one or more communications interfaces 270 capable of sending and receiving data with a variety of devices, such as with third-party databases and/or remote monitoring devices. In a number of embodiments, the communication interface 270 is in communication with the processor 260 and/or the memory 280. In several embodiments, the memory 280 is any form of storage storing a variety of data, including, but not limited to, a remote monitoring server application 282, task status data 284, service center data 286, and third-party data 288. In many embodiments, the task distribution application 282, sensor data 284, a geographic database 286, and/or third-party data 288 are stored using an external server system and received by the remote monitoring server system 250 using the communications interface 270. The processor 260 can be directed, by the remote monitoring server application 282, to perform a variety of remote monitoring processes described herein.

Although specific architectures for remote monitoring devices and remote monitoring server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Mounting Devices

Remote monitoring devices may be mounted to various points on an object using a variety of brackets. A car builder or maintenance mechanic can weld the brackets in various locations around each railcar during the build to allow the sensors to function properly. The designs for the brackets focus on ease of manufacture, ease of application, and secure sensor mounting.

Figure 3:
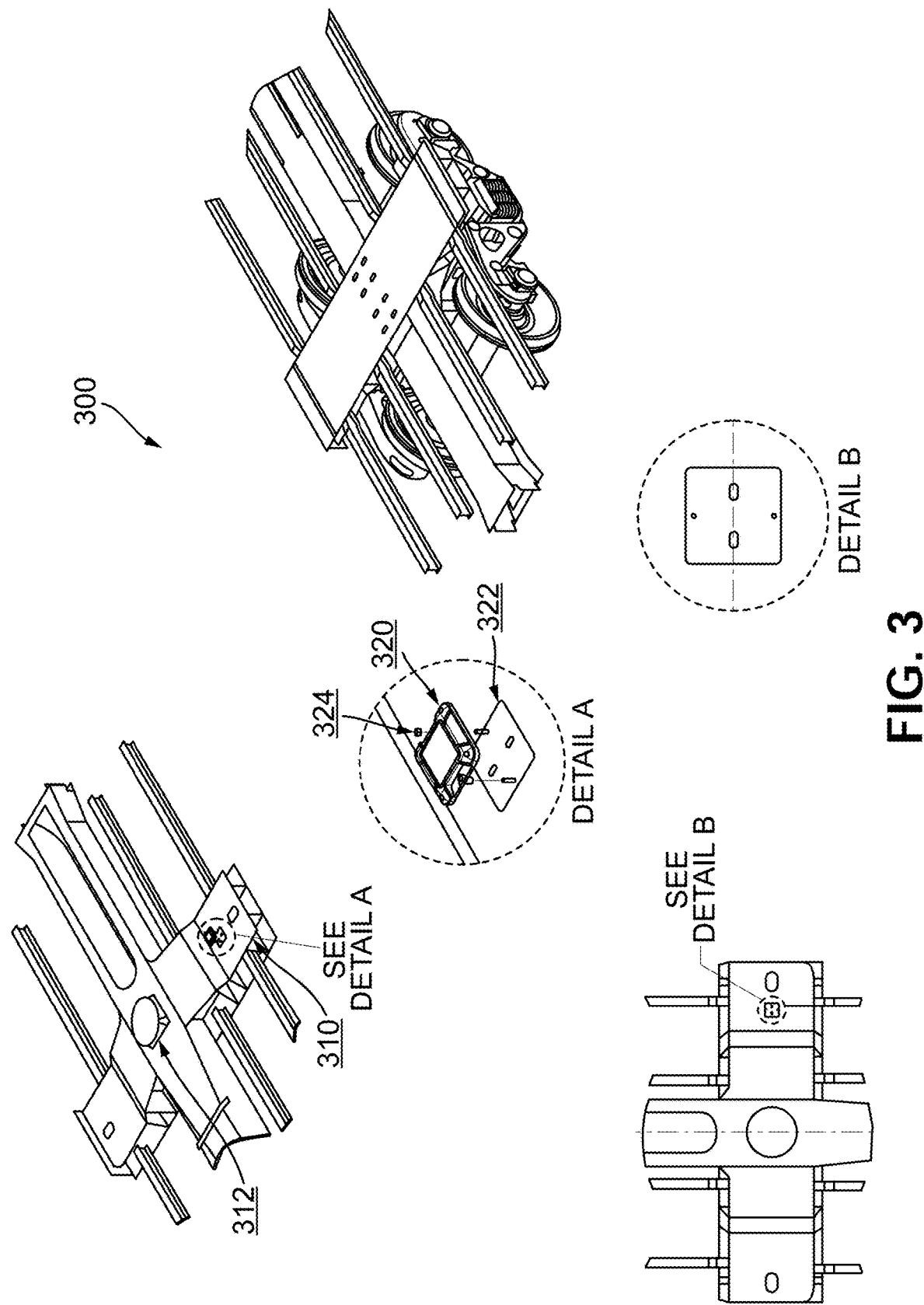
Figure 5:
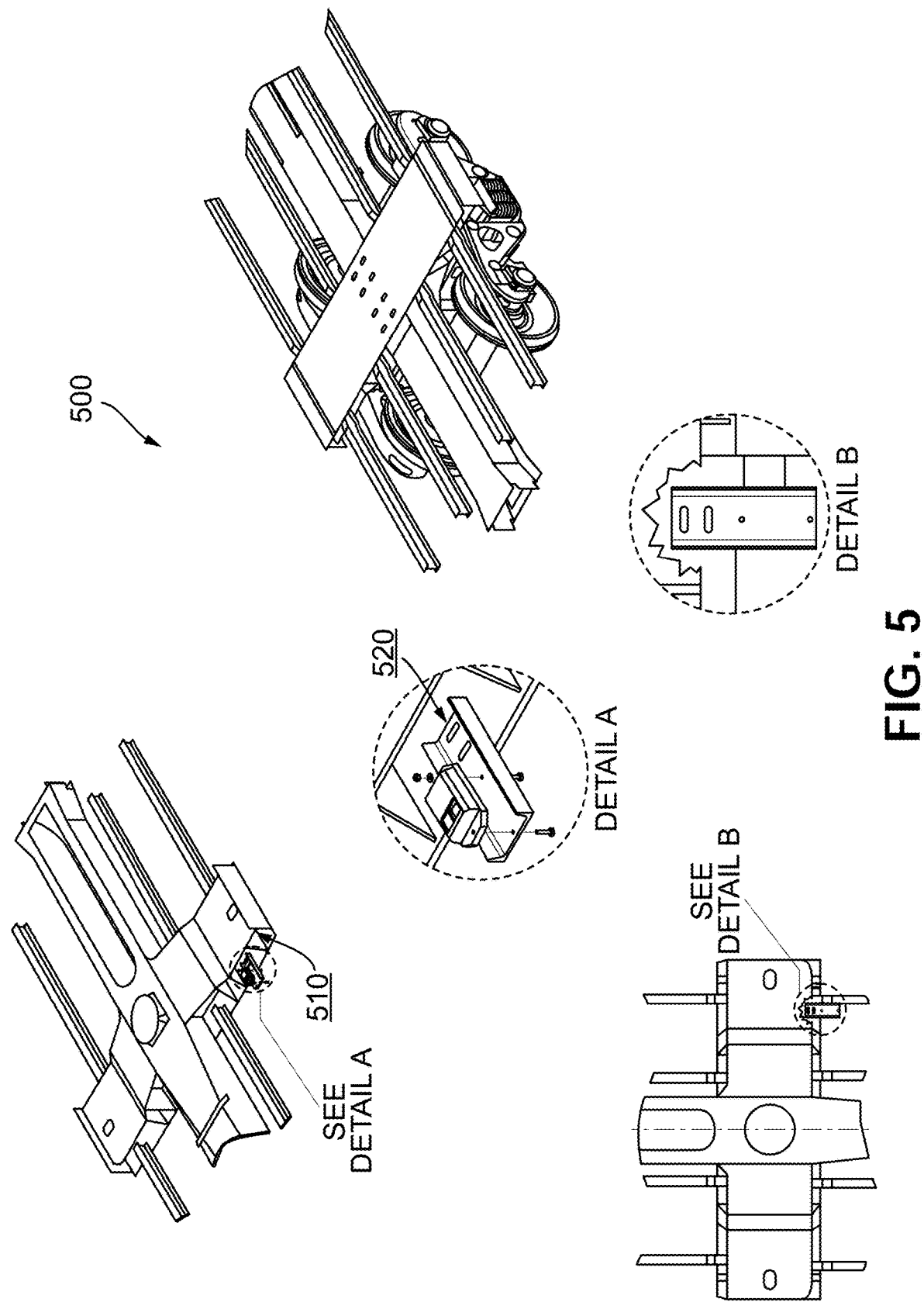
Figure 6:
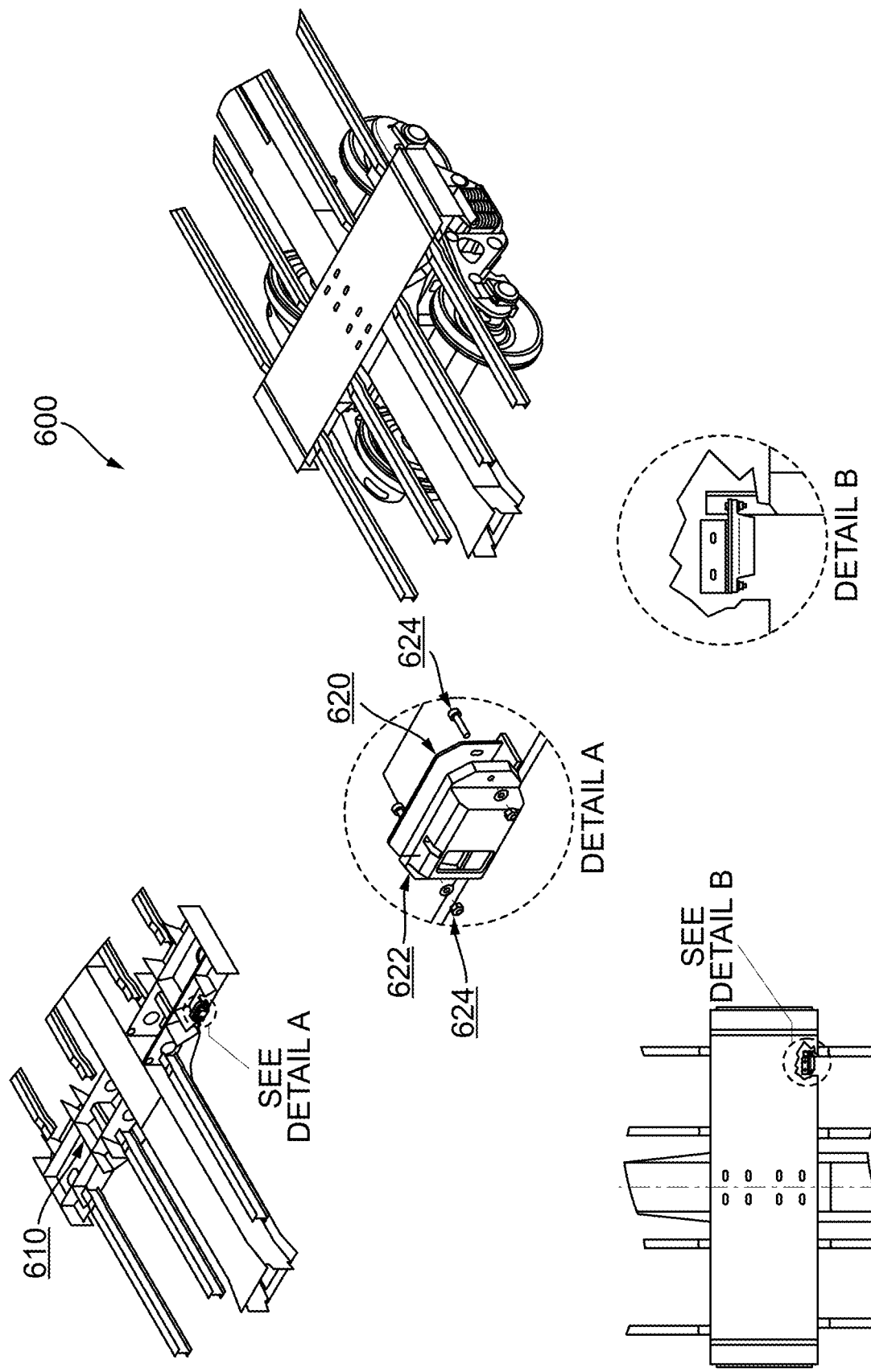
Figure 8:
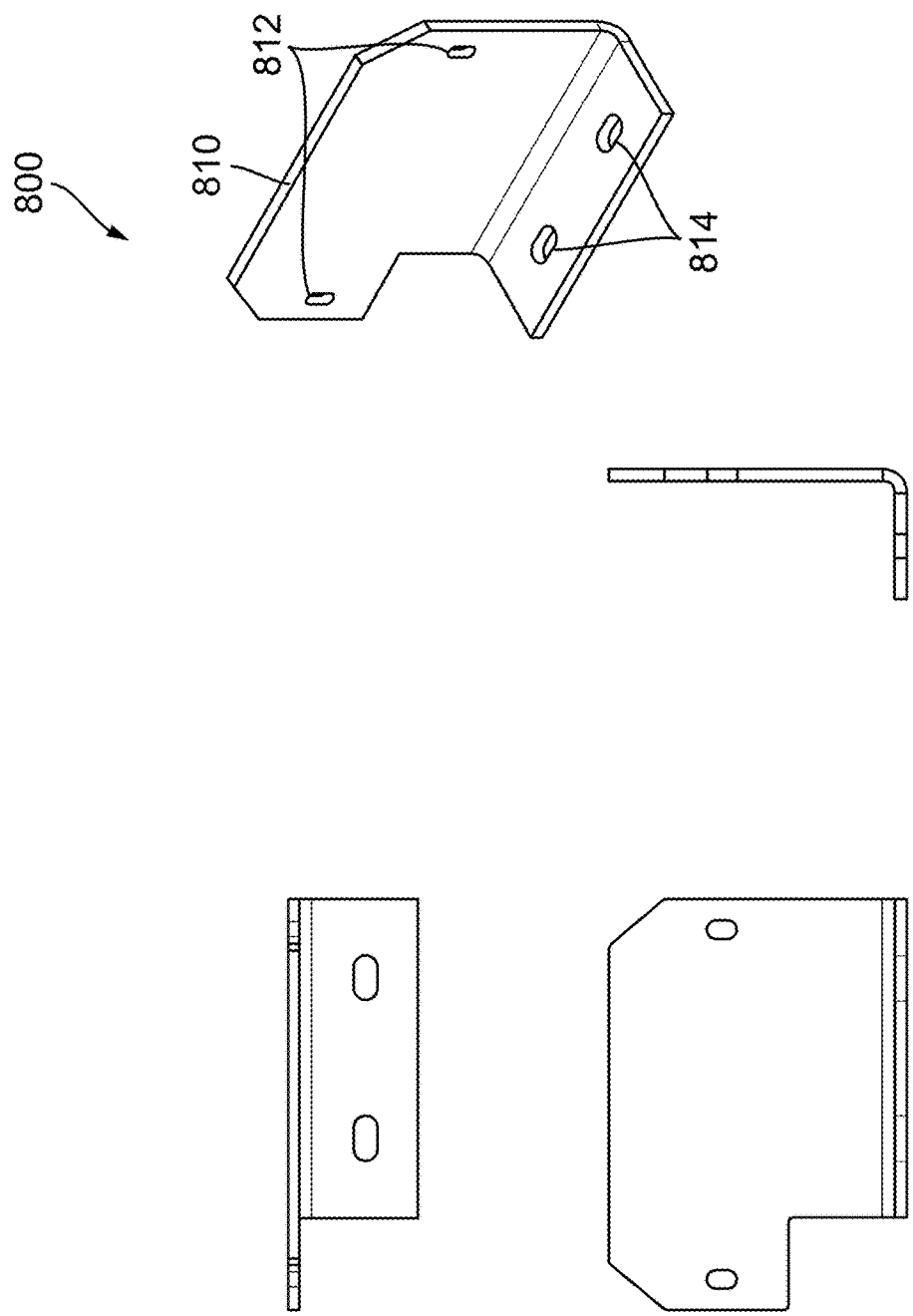

Remote monitoring devices capable of measuring empty load can utilize a direct line of sight to calculate distance information from the sensor to the side frame. A variety of bracket designs and mounting locations for remote monitoring devices to measure empty load are shown in FIGS. 3-8. As shown in FIG. 3, in several embodiments, an empty/load sensor 320 mounts underneath the body bolster 310 facing downward over the side frame and/or angled at the side frame. The bracket 322 can be plug welded along the centerline of the body bolster on one side of the car. The remote monitoring device can fit over two threaded studs and secures with two locknuts 324. As shown in FIG. 4, an empty load bracket 410 can be a flat piece of sheet metal with two slots 412 for welding to the body bolster. It can have two threaded studs 414 for attaching the sensor. As shown in FIG. 5 a bracket 520 can be plug welded to the underside of the top plate of the body bolster. As shown in FIG. 6, a bracket 620 can be plug welded to the top side of the bottom plate of the body bolster 610. A remote monitoring device 622 can bolt onto the bracket 620 with two through-slots and secures with two locknuts 624. As shown in FIG. 7, an empty load bracket 710, due to the overhang design of the bracket, may be manufactured from C-channel steel. The heavier gauge design accounts for the increased moment forces and vibration that the location will encounter. The empty load bracket can have two slots 712 for plug welding and two smaller slots 714 for bolting on the remote monitoring device. As shown in FIG. 8, an empty load bracket 810 can include a piece of bent sheet metal with two slots 814 for plug welding to the body bolster with has two additional slots 812 for bolts.

Figure 9:
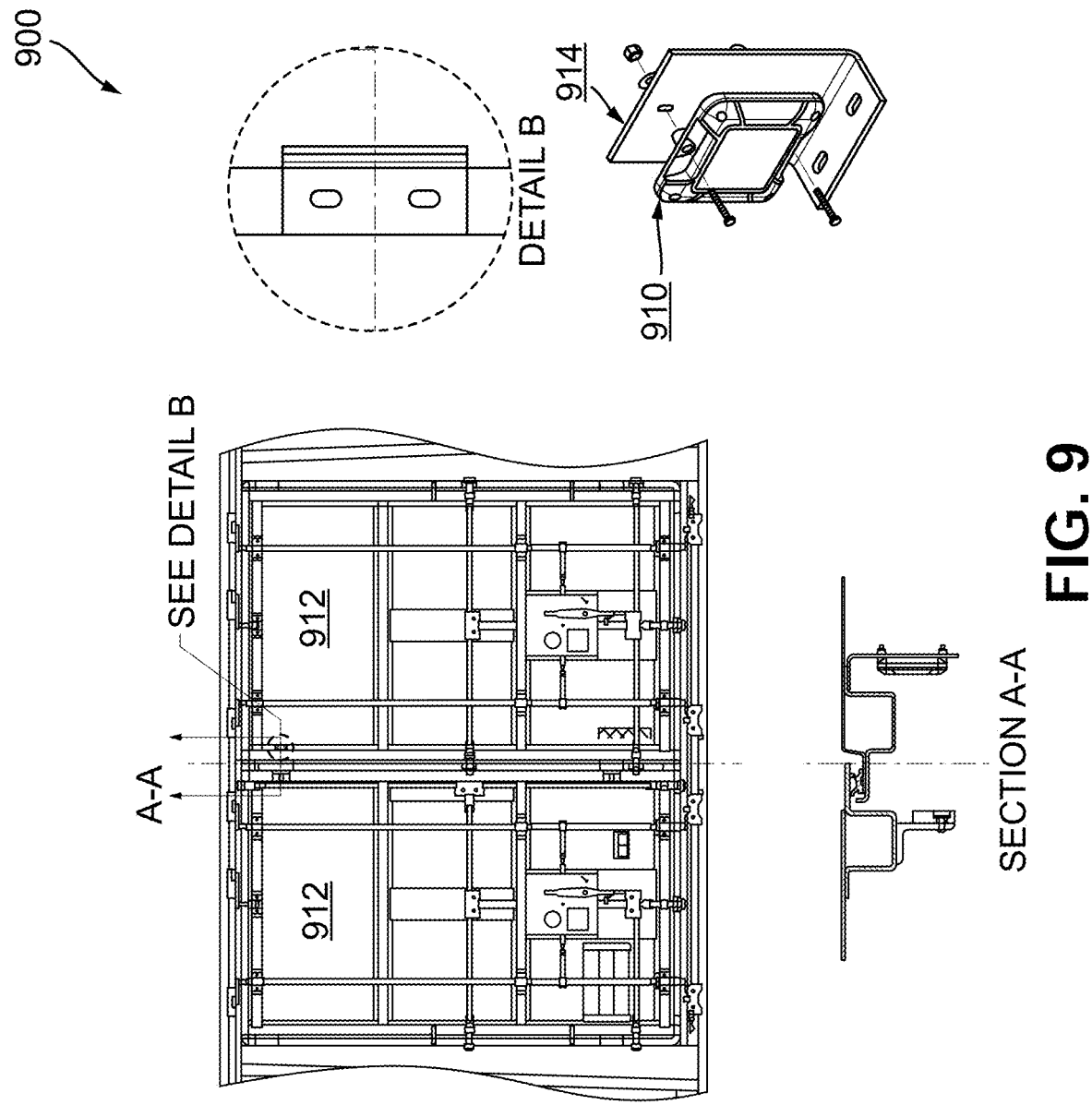
Figure 11:
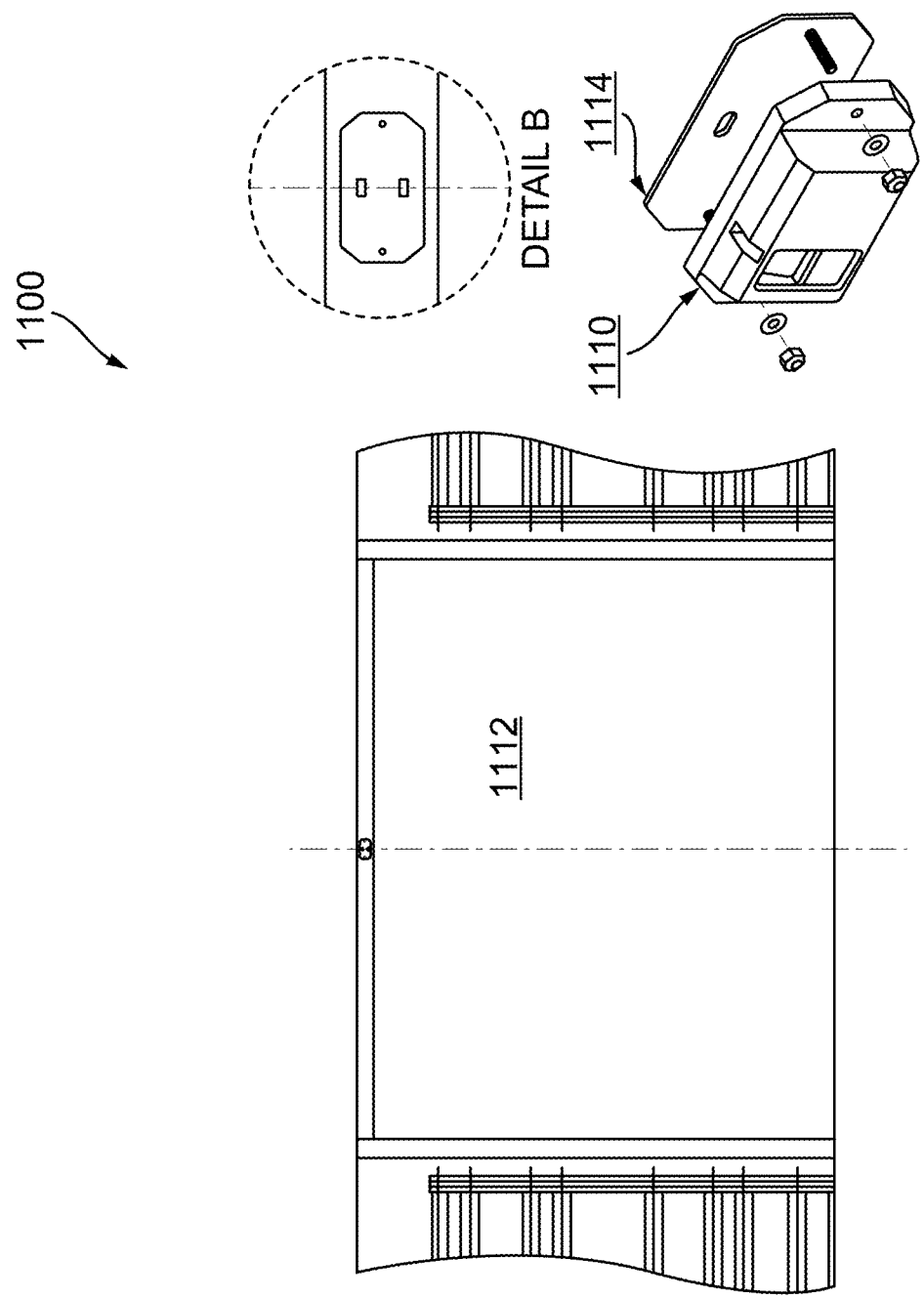

Remote monitoring devices capable of determining the status of a door on an object can be mounted in a variety of locations on the object. A variety of bracket designs and mounting locations for remote monitoring devices to measure door status are shown in FIGS. 9-12. As shown in FIG. 9, a remote monitoring device 910 can mount on a structural member of each auxiliary boxcar door 912, protruding over the member directly across from the doorstop on the main door. The bracket 914 can be plug welded onto the structural member. The remote monitoring device can bolt onto the bracket with two through-slots and secures with two locknuts. As shown in FIG. 10, a door open/close bracket 1010 can be a piece of bent sheet metal with two slots 1014 for plug welding to each auxiliary door of the boxcar with two additional slots 1012 for bolts. As shown in FIG. 11, a remote monitoring device 1110 can mount on the inside wall of one boxcar door opening 1112, just above the opening itself. The bracket 1114 can be plug welded onto the wall. The remote monitoring device can mount over two threaded studs and secures with two locknuts. As shown in FIG. 12, a door open/close bracket 1210 can include a flat piece of sheet metal with two slots 1214 for welding to the door wall along with two threaded studs 1212 for attaching the sensor.

In a variety of embodiments, hunting monitors can attach with a plate with two studs, attached near the deck height at the lateral centerline of the car directly above the trucks. Longitudinal impact monitors can attach via a plate bracket with studs to the end sill of the car nearest the coupler opening and lateral centerline of the car. Brake system monitors can attach via a plate bracket with studs nearest to the points at which the air pressure is measured. Wires encased in conduit are run to the air pressure sensors which attach to the air brake pipes through threaded fittings. These threaded fittings are welded to the pipe via saddle weld fittings, tapped couplings, tapped elbows, or bolted between flanges with a tapped wafer flange fitting. Handbrake monitors can be mounted to car structure via a welded plate with studs nearest a brake lever. A reed switch is mounted in the housing, with a magnet attached to the handbrake lever. The housing with reed switch is positioned and welded to the deck such that the reed switch will measure the released position.

Figure 15:
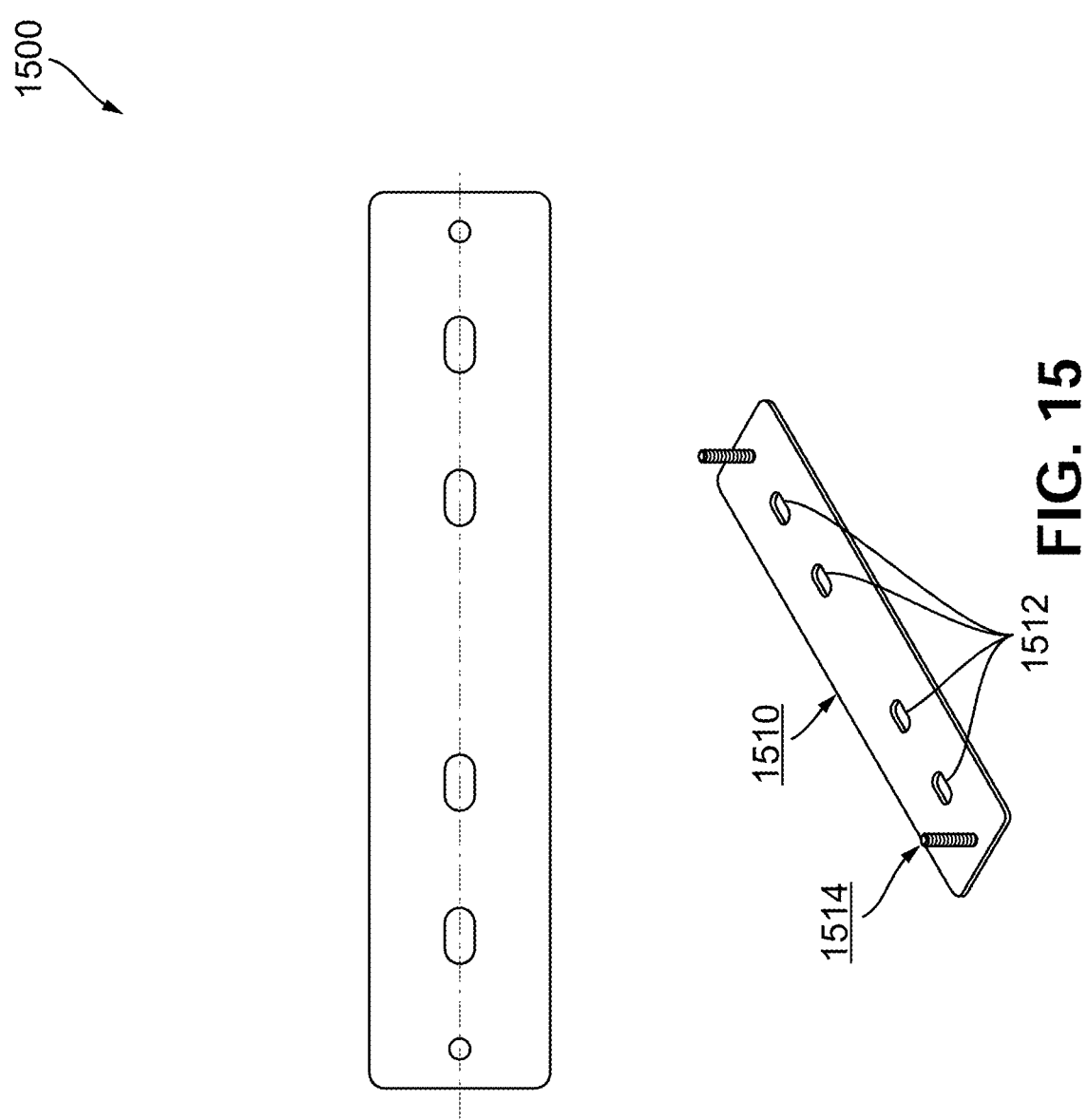

Remote monitoring devices capable of determining the location of an object using GPS, WiFi, cellular, radio, and/or any form of wireless signals can be mounted in a variety of locations on the object. A variety of bracket designs and mounting locations for remote monitoring devices to measure location information are shown in FIGS. 13-15. As shown in FIG. 13, a remote monitoring device 1310 can mount on the rear face of a boxcar 1312. A bracket 1314 can be tack welded onto the face. As stress propagation may not be a concern in this area of the boxcar, tack welds can be used with a variety of bracket designs. As shown in FIG. 14, a remote monitoring device 1410 can mount on the rear face of a boxcar 1412. A bracket 1414 can be tack welded onto the face of the boxcar 1412. The remote monitoring device may fit over two threaded studs and secure with two locknuts. As shown in FIG. 15, the mounting bracket 1510 can be a flat piece of sheet metal with two slots 1512 for welding to the door wall along with two threaded studs 1514 for attaching the remote monitoring device.

A variety of brackets and mounting locations for mounting remote monitoring devices to railcars are described with respect to FIGS. 3-15. However, it should be noted that remote monitoring devices and/or a variety of other sensors can be mounted to any of a variety of objects on a railcar with any of a variety of brackets in accordance with embodiments of the invention.

Remote Monitoring Processes

Remote monitoring devices can utilize any of a variety of location monitoring devices and techniques, such as GPS receivers, cellular tower triangulation, and/or WiFi triangulation, to determine the location of the remote monitoring device. The location monitoring devices can be built into a data transmission unit mounted at the end of a railcar to ensure the best signal reception.

Railcars can utilize coil springs in their trucks (a.k.a. bogeys) to absorb vertical bumps and provide bump damping. The weight of the empty railcar compresses these springs, and as the railcar is loaded more heavily, the springs in the trucks compress further, causing the distance between the sprung mass, such as a car body, and fixed position components, such as side frame, to decrease. A variety of embodiments can measure the distance between the truck bolster and the side frame, or the car body and the rail, or the car body and the ground. Distance sensors can be utilized to measure the spring compression by monitoring the distance between car body and side frame with non-contact distance sensors. Light-based time-of-flight sensors can be used to measure vertical distance between the car body and side frame. This sensor can be housed in a sensor unit that communicates to a remote monitoring device via short-range radio communication protocol. After a measurement is taken, the sensor sends the data to the remote monitoring device. Laser time-of-flight sensor can be used to measure vertical distance between car body and side frame. This sensor can be housed in an enclosure that includes a cellular radio, and the data is collected repeatedly for several hours and subsequently sent as a batch of historical data in a single message.

Distance measurements can be used to determine door status, such as open or closed, and/or for monitoring car loading. Car loading can be calculated based on measured spring compression in the trucks by measuring distance from car body to side frame as the car body moves vertically in relation to side frame as load changes. In many embodiments, the distance measurement can be used to detect the presence of a container or trailer loaded inside a well or on a spine car. Additionally, the length of the container or trailer can be determined by measuring the fixed reference to the end of the trailer or container.

Figure 16:
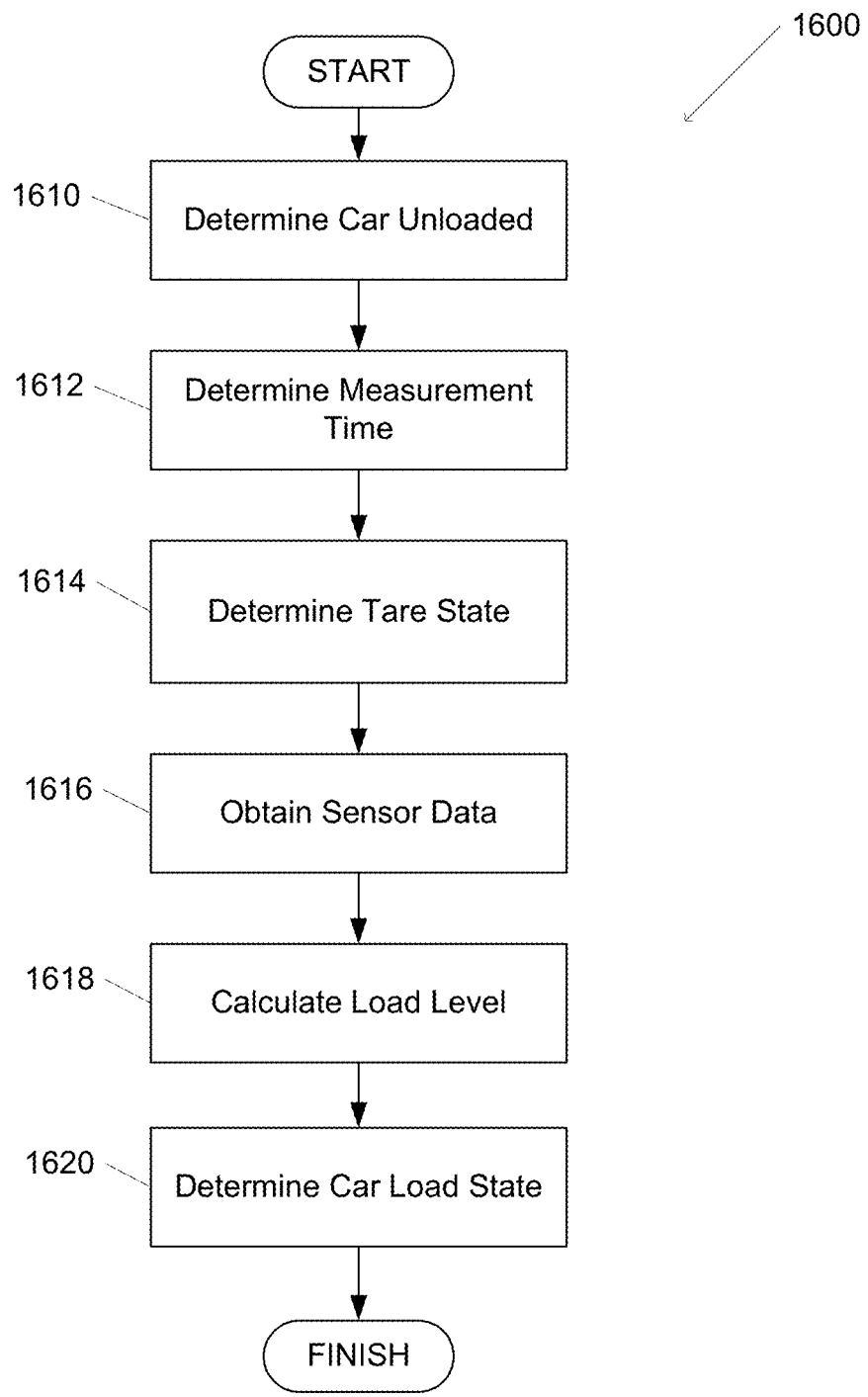
FIG. 16 is a flowchart conceptually illustrating a process for determining a car loaded state in accordance with an embodiment of the invention.

FIG. 16 is a flowchart conceptually illustrating a process for determining a car loaded state in accordance with an embodiment of the invention. Some or all of the steps of process 1600 may be performed using one or more computing devices as described herein. In a variety of embodiments, some or all of the steps described below may be combined and/or divided into sub-steps as appropriate.

At step 1610, a car unloaded state can be determined. A car unloaded state can be determined based on the expected height of the springs. In a variety of embodiments, the expected height of the springs can be determined based on an initial spring height and a calculated spring usage. Additionally, spring rates can be calculated from the spring grouping and truck system. Spring properties are specified by AAR (Association of American Railroad) standards, including coil diameter, bar diameter, solid height, solid capacity, free height, and condemning criteria. These properties can be used to determine the force required to deflect each spring, and summed for all springs on the railcar. Measuring the spring deflection through onboard monitoring and applying the calculated spring rate can be used to determine the total force on the springs, and thus the load on the car. The calculated spring usage can be determined based on previous car loads, lifetime spring compression, car travel distance during the lifetime of the springs, and/or any other factors as appropriate. In this way, the calculated spring usage can be used to correct for fatigue, spring deformity, and/or any other factors that can cause the total spring height to be higher or lower than the initial spring height.

At step 1612, a measurement time can be determined. The measurement time can indicate the testing period to determine a default unloaded state of the car. The measurement time can include a sampling period and a duration. In many embodiments, the measurement period is two weeks of data points collected each hour. However, any duration and/or sampling period can be used as appropriate.

At step 1614, a tare state can be determined. The tare state can indicate the default spring height when the car is unloaded and accounts for the motion of the car. This is important as the weight of the car can cause the springs to compress while the car is moving due to track perturbations even when the car is unloaded. In many embodiments, the tare state is determined based on sensor data indicating the spring height when the car is unloaded and has been stationary. The sensor data can be obtained based on the sampling period for the duration indicated in the measurement time. The tare state can be calculated based on the average spring height indicated in the sensor data. In many embodiments, the tare state can include subtracting an expected spring height from the calculated tare state. In many embodiments, the expected spring height is approximately 11 centimeters. However, it should be noted that the expected spring height can vary between railcar types, spring arrangements, truck types, and/or overall age and wear of the car. It should be noted that any expected spring height can be used as appropriate.

At step 1616, sensor data can be obtained. The sensor data can be obtained when the car is in use. The sensor data can indicate the spring position while the car is at rest or moving.

At step 1618, a load level can be calculated. The load level can indicate the current height position of the springs. The load level can be calculated based on the tare state and the current spring height position. The current spring height position, tare state, and total potential travel of the spring can be used to calculate a percentage that the spring is currently compressed relative to the total potential compression of the spring.

At step 1620, a car load state can be determined. The car load state can be determined based on the current compression of the spring. When the spring is compressed over a loaded threshold, the car load state can be indicated as loaded. For example, the loaded threshold can be 40% such that when the springs are compressed more than 40% the car can be considered loaded. When the spring is compressed less than an unloaded threshold, the car load state can be indicated as unloaded. For example, when the spring is compressed less than 30%, the car can be considered unloaded. It should be noted that any threshold values can be used as appropriate.

It should be noted that the condition of the car, including one or more structural elements of the car, can be monitored. When it is determined that a wear event has occurred for a particular element of the car (e.g. a spring becomes permanently deformed and has an unsprung height of 10 cm instead of the typical 11 cm), the tare state of the car can be automatically recalculated according to a variety of processes described herein. In this way, the load level for the car can be accurately determined based on the current condition of the car.

Door Monitor

Door monitoring can utilize the same physical hardware as load condition monitors. In several embodiments, door monitoring measures ambient light received by the collector used for distance measurement. The sensor can be mounted internally to the railcar, which allows it to measure the internal ambient light. When the door is open, ambient light should increase, and when the door is closed, ambient light should decrease to almost complete dark. This sensor can be housed in a sensor unit that communicates to a remote monitoring device via short-range radio communication protocol. Door monitoring devices can utilize the same physical hardware as the load condition sensors that report a distance measurement. The sensor can be housed in an enclosure that includes a cellular radio, and the data is collected repeatedly for several hours and subsequently sent as a batch of historical data in a single message. The conversion from measured distance to door status can be performed by a remote monitoring device and/or a remote monitoring server system. For example, when the measured distance is below a prescribed amount, the door stop is close enough to the opposite door to conclude that the door is closed. Similarly, if the distance is greater than the prescribed amount or no distance is measured (due to inability to "see" the door stop via reflected laser signal if it is too far away), the conclusion is that the door is open.

Airbrake Monitor

Information generated from sensors can be consumed and processed by the remote monitoring devices and/or remote monitoring server system. Processing by the remote monitoring devices can allow for real time analysis and alert generation of information. For example, a temperature sensor on the wheel can detect high temperatures (raising temperature) without a change in brake pressure indicating there is a stuck brake or hand brake applied. A brake system pressure sensor can measure air pressure on a trainline pipe, brake reservoir, cylinder pipe, and/or the empty load pipe, to determine conditions of the air brake system. One potential condition that can be determined is whether the air brakes are being applied or released by comparing the pressure in the trainline pipe to the brake reservoir. An additional condition that can be determined is whether the correct air pressure is being achieved in the brake cylinder by comparing the pressure of the brake cylinder to the trainline pipe. An additional condition that can be determined is whether the empty load system is operating correctly by comparing the empty load pipe pressure to the brake cylinder and trainline pressure. The empty load system pressure can further be scrutinized by comparing the empty/loaded condition of the railcar and the air pressure achieved in the brake cylinder. By measuring the pressure in the locations mentioned, one can determine if the brake system is functioning as intended, or if components of the brake valve, brake cylinder, or components of the empty load system are functioning correctly. Pressure sensors installed on the brake system pipes are predominantly used to measure the air pressure in the pipe, but may also measure humidity in the pipe, and temperature of the air in the pipe. Measuring air pressure can be used to determine a variety of characteristics of the braking system, including but not limited to determining how often air brakes are used on various types of equipment, how long brake are applied for when they are used, geographic locations that brakes are used more than others, and/or relating brake applications to other maintenance, such as wheelset replacements, brake shoe replacements, and the like.

A monitoring device may include an accelerometer to determine whether a railcar was in a state of motion at the time of the measurement. Depending on the state of the motion, it may be possible to measure other attributes of the railcar. Depending on measurements from the trainline, empty load, brake cylinder pressures, and/or the state of motion, different events can be described and monitored. Such events may include initial charging of the brake system, releasing the brakes, slow leaks in the pipes, application of the brakes, service applications, and emergency brake application. With the addition of GPS and accelerometer information, it is possible to interpret the intent and result of each braking cycle to create braking events.

In one example, if the railcar is in motion and the trainline pressure is around 90 pounds per square inch (psi), while the brake cylinder pressure is around 0 psi, it may be determined that the brakes are not applied. If a rapid depressurization of the trainline air pressure occurs with a subsequent increase in brake cylinder pressure, an emergency brake application while the car was in motion may be determined from the data. The event may be confirmed through a subsequent reduction in speed as measured on the GPS device and/or acceleration measured on the device accelerometer.

In other examples, fluctuations in trainline pressure, brake cylinder pressure, or a stationary railcar may be measured by the air brake monitor. In this situation, it may be determined that the brake system on the train is charging or that the air brakes are being cycled to confirm proper operation. If this occurs in a yard, it may be determined that a Class I or Terminal air brake test is being conducted prior to the train's departure. The event may be confirmed through a subsequent GPS movement event of the railcar and/or acceleration measured on the device accelerometer.

Cycling of the air brakes may be measured with operational changes in trainline pressure. When trainline pressure changes in magnitude or at a rate above a defined threshold, a brake application event may be determined. Each brake application event causes pneumatic systems within the brake system to have a mechanical system response. Brake valves, cylinder pistons, brake shoes, and other components of the brake system may have a finite life due to wear and degradation related to cycling. Braking events measured using the air brake monitor allow for measurement of usage rates of a railcar's air brake system. Air brake applications per mile, or air brake applications per trip, or time spent braking per mile, or time spent braking per trip can be measured among other metrics. Car repair billing and UMLER (Universal Machine Language Equipment Register) data can be compared to these braking events to calculate brake cycles per valve, or brake cycles between single car air brake tests.

Brake applications while moving may be measured and attributed to brake shoe wear and wheel wear. To stop a train, the air brakes convert the air pressure to mechanical force through the brake cylinder. This brake cylinder applies mechanical force through the brake linkage to push brake shoes against the wheel tread to slow down the railcar. Using the air brake monitor, it is possible to merge braking events with brake shoe and wheelset replacement data to understand the maintenance cycles associated with braking event quantities and rates. The GPS speed and deceleration of the car can also be measured and related to braking events to determine a braking magnitude. This can be used to understand how the braking cycles and magnitude attribute to brake system maintenance and wear in the brake shoes and wheel tread. In addition, this data can be aggregated and compared to component wear limits to predict the future failure of components within the brake system.

It is also possible to connect third party information, such as Railinc Equipment Health Monitoring System alerts (EHMS) in order to validate alerts and provide additional information around the event such as, for example, exact time of separation and other attributes not included such as braking history before the event and valve function.

Piston Travel Monitor

Combining air pressure measurements with other remote monitoring can be used to diagnose and direct maintenance to defective equipment. As an example, the air brake cylinder piston travel can be measured using a time of flight distance measurement device. The time of flight distance measurement sensor can be affixed to the brake cylinder body, and a target plate can be affixed to the brake cylinder piston which moves relative to the brake cylinder body as the brakes are applied. The time of flight distance measurement device measures the time of flight of a signal from the measurement device to the target plate and back to the measurement device. In other embodiments, the distance measurement can be taken directly between the piston and a fixed mounting location on the air brake housing such as the non-pressure head. As the brake cylinder piston travels relative to the brake cylinder body, this time of flight measurement changes and the piston travel can be determined. The time of flight distance measurement device and the target plate can also be affixed to any components of the brake rigging that have relative motion to each other during brake cylinder piston actuation and any applicable motion ratios between that area of the brake rigging and the brake cylinder piston can be utilized to determine piston travel relative to brake cylinder body. The piston travel is directly related to the force output of the brake system. Every brake cylinder design has a required piston travel zone of acceptance, of which is visually measured on cars using a tape measure or gage while the brakes are applied with a specific amount of air pressure in the brake cylinder. Operational requirements dictate that this is to be inspected and measured visually while brakes are applied, before a train departs an originating location as detailed in Federal Railroad Association (FRA) CFR § 232.205. This Class I brake inspection, or Terminal Brake Inspection, can be simplified through the use of remote monitoring by completing the brake pressure monitoring and piston travel monitoring with on-board devices. At any time the brakes are applied, whether in a terminal or in line of road, the cylinder pressure and piston travel can be measured and determined if within the acceptable limits. Maintenance may be directed to specific railcars if it is determined that the cylinder pressure does not match the corresponding acceptable piston travel, indicating the piston travel requires adjustment.

Impact Monitor

Longitudinal impact, or accelerations of the car body as a result of coupling, draft or buff forces, and in-train accelerations can be measured with a longitudinal accelerometer can be monitored using an impact measurement device. This longitudinal impact measurement device can be mounted to the end sill of the railcar near the coupler opening and measure the acceleration during an impact event. Threshold accelerations can be set on the device, when over said acceleration the device records the acceleration vs. time event. Trending this data over time can help determine if the draft system damping is degrading or requires maintenance. In addition, monitoring the geographic location of large impact events may allow for improvements in personnel training of the location conducting high impacts, or changes in practices at these locations. Further, if a longitudinal impact monitor is installed on a coupler and the car body, the input and response is measured. By comparing the acceleration details of the input and response, a more detailed evaluation of the draft system performance can be completed. For example, if railcar draft systems have similar input and response accelerations, it can be determined that a lack of longitudinal impact protection, or longitudinal damping is present and the draft system may require maintenance.

A device that utilizes a multi-axis accelerometer to monitor for acceleration events may need to account for an operational reference frame before data collection and processing. In some examples, this reference may be Earth's gravitation field. For example, a 3-axis accelerometer may detect 0 g in the longitudinal and lateral directions (x-axis and y-axis), and 1 g in the vertical direction (z-axis). Events that trigger operation may be based on a defined threshold away from this reference frame. Accelerometers may be configured (e.g., programmed) to operate in either an "absolute" or "reference" mode for detecting such events. Absolute mode may provide absolute readings, e.g., 0 g, 0 g, 1 g in the x-, y-, and z-axes, respectively, when the accelerometer is at rest which reflects the Earth's gravitation field. Reference mode may subtract a 3-dimensional vector from 3-dimensional readings to account for a reference frame, e.g. 0 g, 0 g, 0 g may be the provided reading while the accelerometer is at rest in reference mode. Defined event thresholds may then be compared against this reference-frame-corrected reading. Reference mode may be useful when threshold settings are less than 1 g. In such cases, absolute mode may trigger constant event detection even when the device is at rest.

An appropriate reference frame, therefore, may be defined prior to an event detection period (e.g., prior to entering a low-power sleep mode). A deviation away from a defined reference frame that exceeds a defined threshold (including, e.g., a <1 g threshold) may thus trigger the detection of an event. A suitable reference frame may be 0 g, 0 g, 1 g (x, y, z), but could be any vector that totals 1 g, depending on a device's installed orientation on the railcar. Detection of an appropriate reference frame as a basis for event detection may be useful where the data collection, processing, and transmission algorithm completes a cycle while the railcar is still moving and experiencing 3-axis acceleration fluctuations. In such situations, the reference frame may be reset to match the ideal condition.

After completing a data collection, processing, and transmission cycle, the 3-axis acceleration values may be continuously monitored until the correct reference frame is obtained for the device's installed orientation (e.g., 0 g, 0 g, 1 g). A small error from a defined reference frame may be allowed and configurable in software. Once a reading that is close to the defined reference frame is obtained, the reference frame of the accelerometer can be reset based on that reading.

Figure 22:
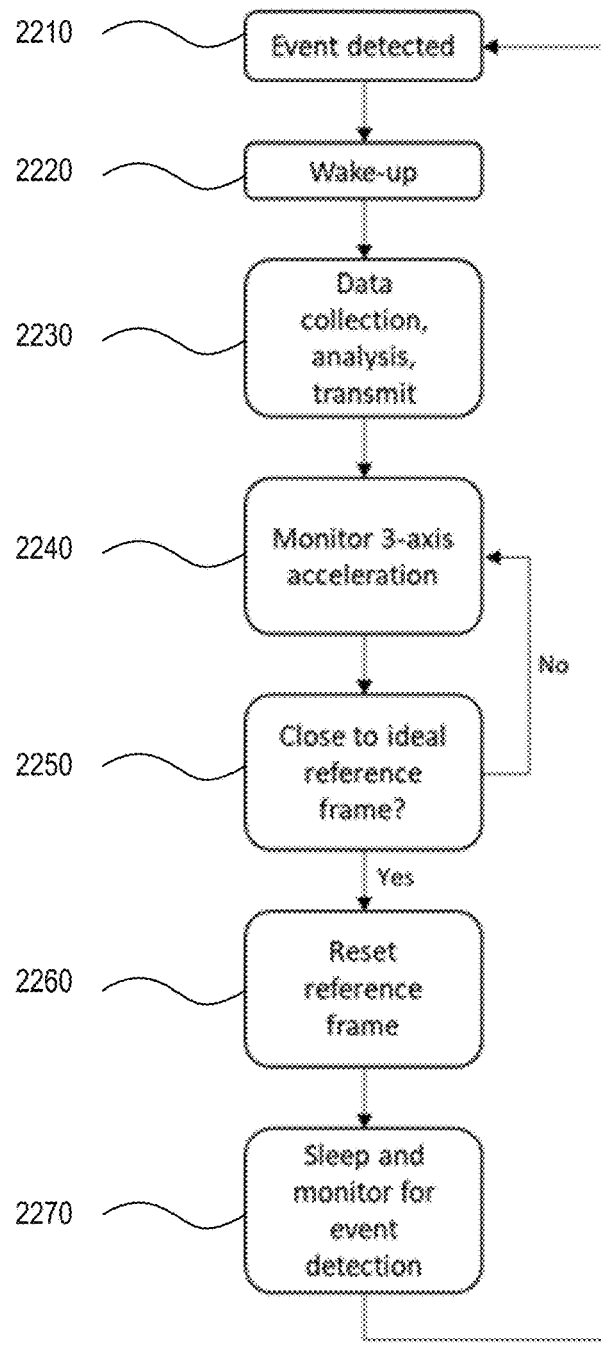
FIG. 22 is a flowchart conceptually illustrating a process for resetting a defined reference frame in accordance with an embodiment of the invention.

FIG. 22 is a flowchart conceptually illustrating a process for resetting a defined reference frame. Some or all of the steps of process 2200 may be performed using one or more computing devices as described herein. In a variety of embodiments, some or all of the steps described below may be combined and/or divided into sub-steps as appropriate.

At step 2210 the accelerometer may detect an event. For example, the event may be a threshold acceleration in one or more axes (e.g., x-, y-, or z-axis).

At step 2220, based on the detected event, the accelerometer may signal the main microcontroller to wake up, e.g., if the microcontroller is powered down or in a low-power mode (e.g., a sleep mode). If the microcontroller is not powered down or in a low-power mode, the accelerometer may signal the microcontroller to begin data collection and processing.

At step 2230, the microcontroller may perform a data collection, processing, and transmission cycle as described herein. For example, once the data collection and processing is complete, the microcontroller may transmit the data (e.g., via a cellular module).

At steps 2240 and 2250, after the data collection, processing, and transmission cycle is complete, the device may continuously monitor the 3-axis acceleration readings until the detected readings are close to the defined reference frame. For example, the 3-axis acceleration readings may be determined to be close enough to a defined reference frame when readings from each axis (e.g., x-, y-, and z-axis) are within a threshold of each corresponding axis of the defined reference frame.

At step 2260, once the 3-axis acceleration readings are close enough to the defined reference frame, the microcontroller may reset the reference frame of the accelerometer. For example, the reference frame may be reset to the originally defined reference frame.

At step 2270, after the reference frame has been reset, the device, accelerometer, or both may return to a low-power mode (e.g., a "sleep" mode) to await the next detected event. The above steps may then be repeated when the next event is detected.

Example pseudocode for implementing the above steps is provided below:

```
define x ref = 0;
define y ref = 0;
define z ref = 1;
define err = 0.1;
boolean ref frame detected = false;
method detect reference( ) {
    while (ref frame detected is false) {
        accelerometer.read(x-accel, y-accel, z-accel);
        if (x-accel > (x ref - err) and x-accel < (x ref + err)) and
        if (y-accel > (y ref - err) and y-accel < (y ref + err)) and
        if (z-accel > (z ref - err) and z-accel < (z ref + err)) then
        {
            ref frame detected = true;
        }
    }
    accelerometer.resetRefFrame( );
    ref frame detected = false;
}
method main ( ) {
    collect data( );
    process data( );
    transmit data( );
    detect reference( );
    sleep( );
}
```

Handbrake Monitor

Handbrake state monitoring can be beneficial to determine if a car has been moved with the handbrakes applied. When this occurs, it can be particularly damaging to the wheels and often generates flat spots where the wheels were dragged. An example embodiment may use a remote monitoring device with a reed switch to determine if the handbrake is set or released. This reed switch can be placed in a fixed position near a lever, sheave wheel, brake rod, or chain that moves when the handbrake is applied or released. A magnet can be mounted on the moving component of the brake rigging and used to activate the reed switch. Ideally, the reed switch monitors the handbrake when it is in the fully released position and the geographic location and movement state of the railcar at the time can be recorded. This will allow users of the data to understand if and where railcars are being used without a fully released handbrake and address this condition with focused training or other means. Additional embodiments of this monitor may use distance measurement to determine the position of a lever, sheave wheel, brake rod, or chain relative to the fixed position. This distance measurement can be used to determine if the handbrake is applied, and a relative measurement of the magnitude of the application. Onboard monitors may use strain gauges within the brake rigging to monitor force on the handbrake linkage. This strain gauge may be attached to a brake rod, within the chain linkages, to a brake pin, or anywhere else within the rigging. This will allow for the remote monitoring of the brake force through the handbrake linkage.

Measuring the state of the handbrake system, e.g., whether the handbrake is set or released, can be accomplished in many different ways. In one embodiment in which the brake linkage consists primarily of brake levers and/or bellcranks, a position sensor can be mounted to the lever or bellcrank to trigger an event with a change in angular position. In brake rods, chains, or sheave wheels, a position sensor can be mounted to trigger an event with a change in linear position. This position sensor may consist of a magnet and reed switch, or other proximity sensors such as inductive sensors, ultrasonic sensors, or other non-contact distance measuring sensors.

An example mounting location to measure handbrake status is shown in FIGS. 23A-23E. As seen in FIGS. 23A-23E, in an example embodiment of measuring handbrake status on a railcar, a magnetic bracket 2310 may be attached to a vertically arranged bellcrank 2320 mounted near the end sill of the railcar. This bellcrank 2320 may rotate about a fixed axis when the handbrake 2330 is applied, thus pulling on the brake linkage 2340 and applying the brakes. When the handbrake 2330 is released, gravity and strain in the system may return the linkage 2340 and bellcrank 2320 to a neutral, consistent position. A handbrake remote monitoring device 2350 having an integrated reed switch may be attached to a fixed position on the car body. The position of the handbrake remote monitoring device 2350 may be in proximity of the magnet 2360 such that when the handbrake 2330 is fully released, the magnet on the bellcrank 2320 activates the reed switch indicating the handbrake is released without physical contact between the magnet and the device. In some embodiments, an inductive sensor may be used in place of a reed switch to determine the presence of a bellcrank in the natural handbrake released position. In other embodiments, the magnet mounting bracket 2310 may be attached to a lever, sheave wheel, or other moving component of the brake system, and the handbrake remote monitoring device 2350 with integrated reed switch may be placed in a fixed position on the car body to achieve the same result.

Figure 23A:
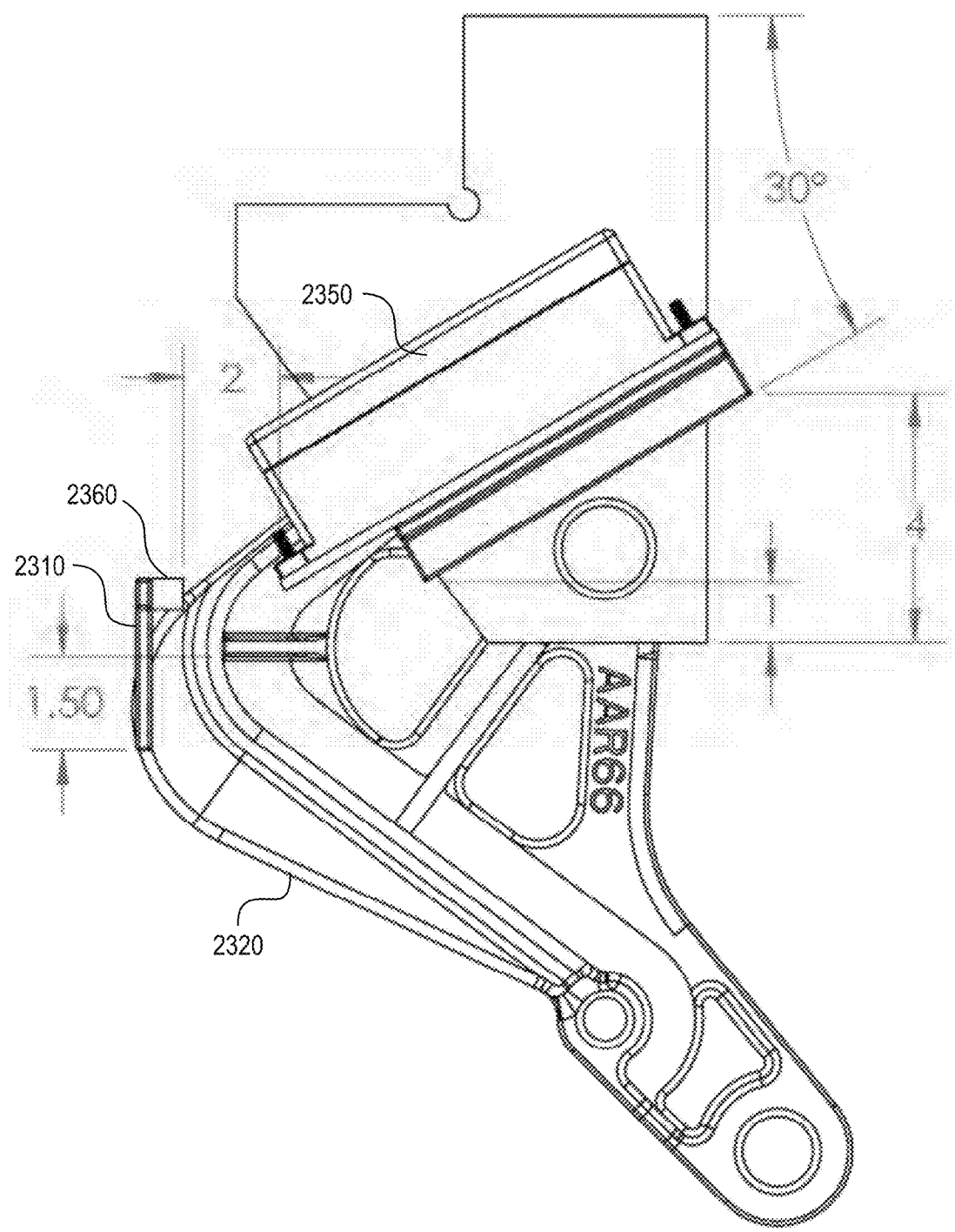
Figure 23B:
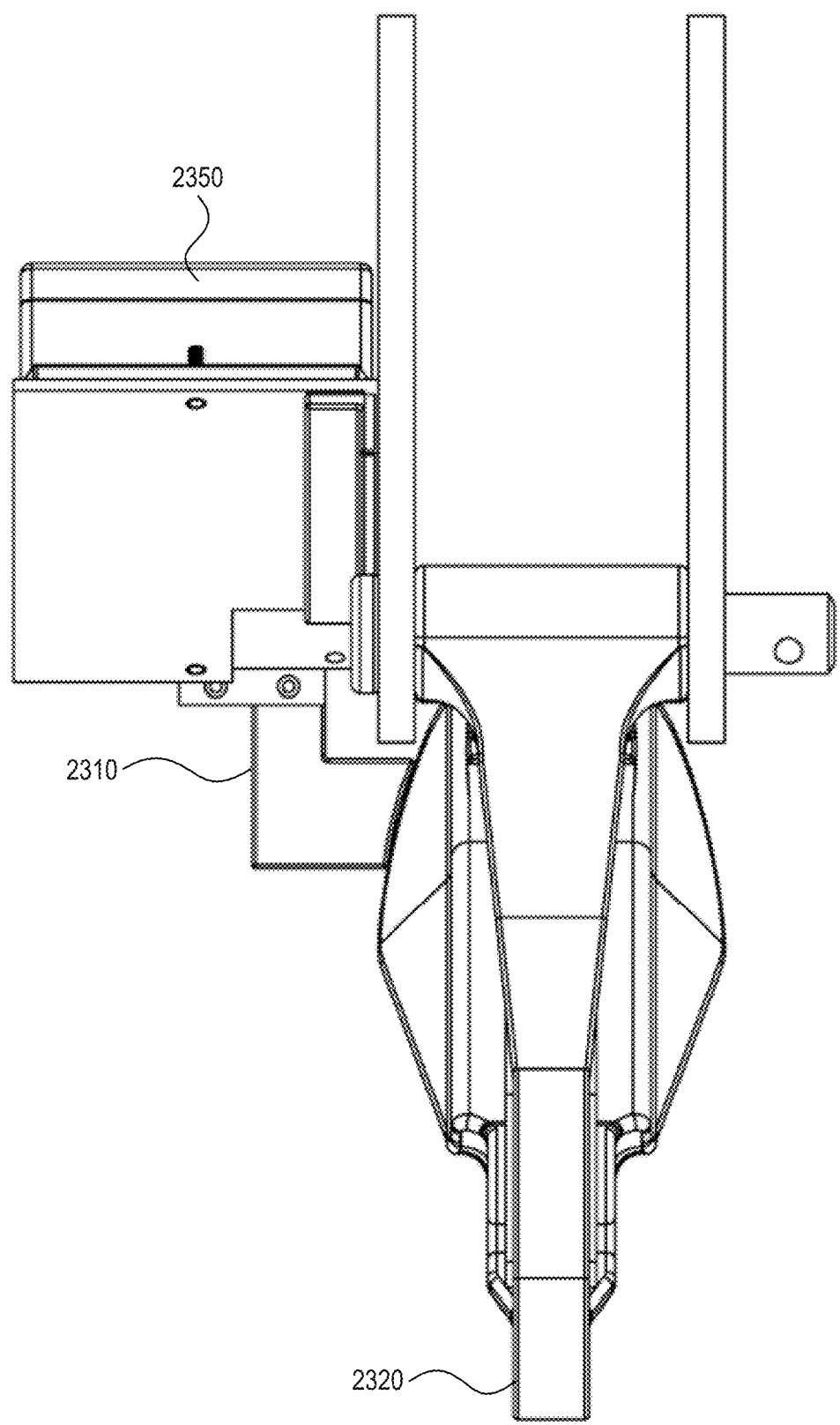
Figure 23C:
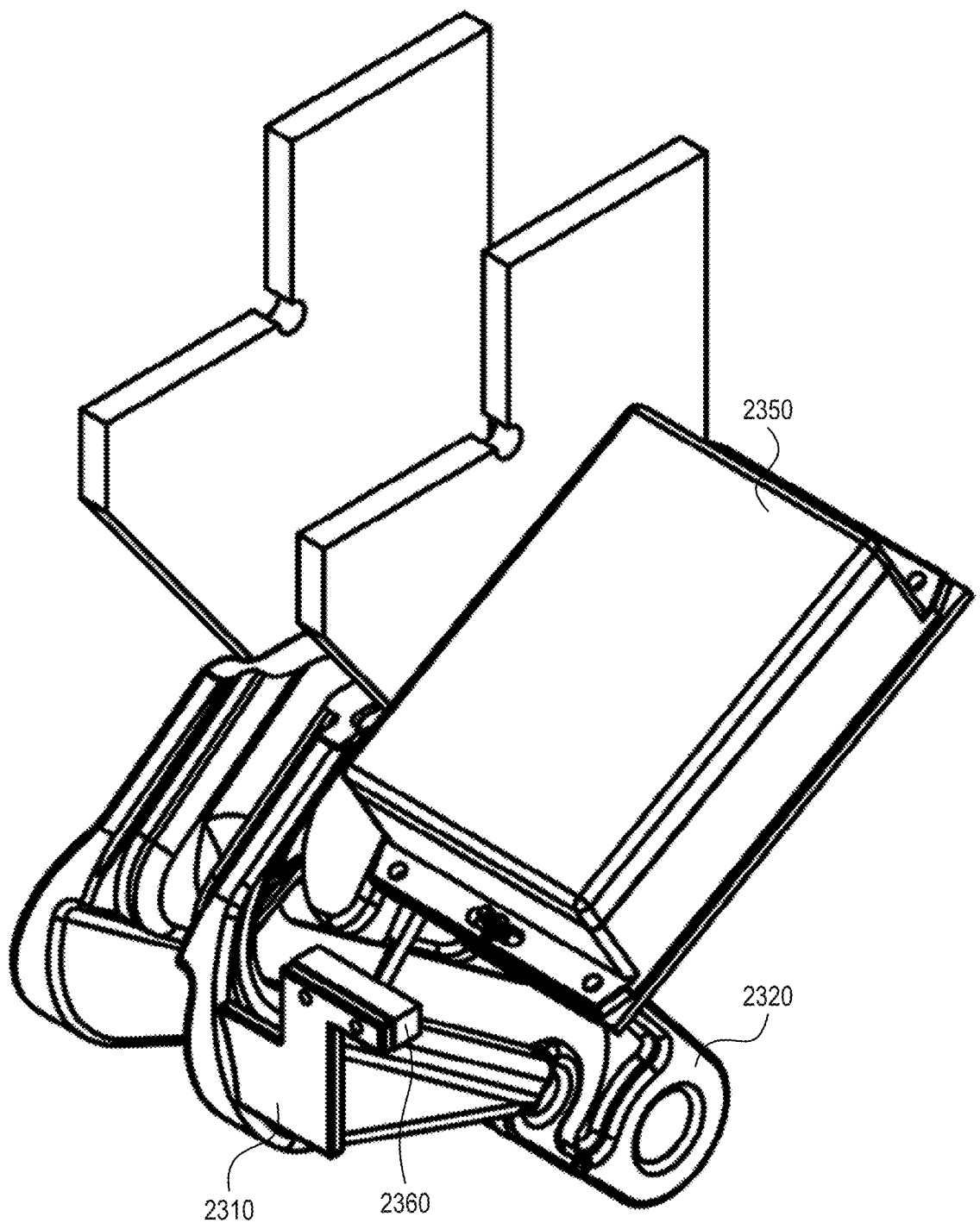
Figure 23D:
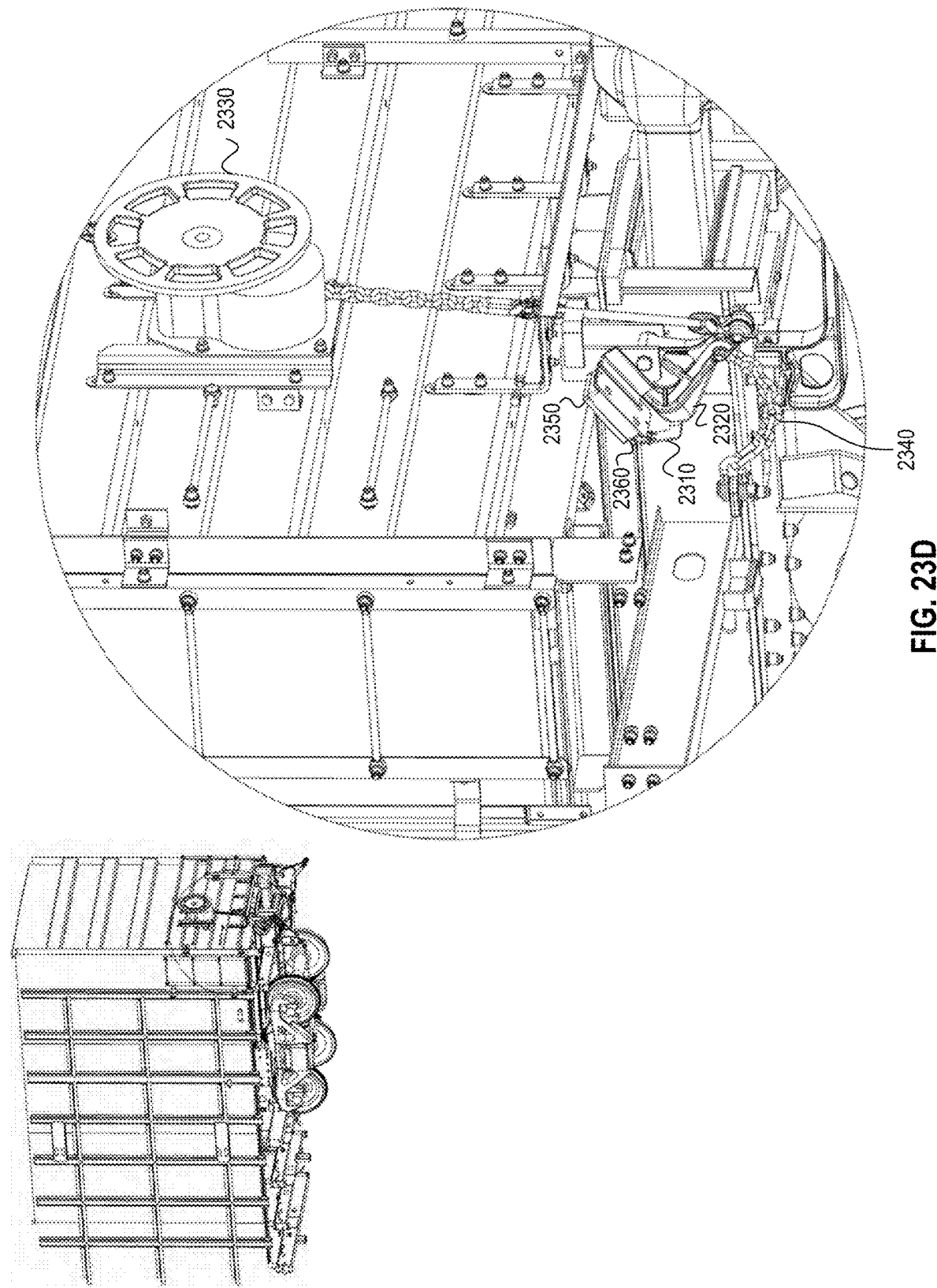

Consistent activation of the switch may depend on the placement of the magnet mounting bracket 2310 on the bellcrank 2320 and handbrake remote monitoring device 2350. As seen in FIGS. 23D-23E, in some embodiments, a two piece bracket may allow adjustment to the location of the magnet 2360. During installation of the handbrake remote monitoring device, the magnet position can be adjusted until consistent operation of the switch is achieved. Adjustment may be accomplished using more than one bracket and joining with slotted holes and fasteners, or adjusting the position and welding the mounting brackets together. The flexibility in a multi-piece bracket design allows the bellcranks to be fabricated separately from the application, with the ability to adjust the magnet position until the desired results are achieved even in cases of poor application precision. An example of a one-piece bracket is shown in FIGS. 23A-23C.

The handbrake remote monitoring device 2350 may be configured (e.g., programmed) with a debounce algorithm to reduce event misinterpretation. False triggers of the reed switch may result from vibration while the railcar is in motion or from hard impacts during coupling events. The mechanical characteristics of the magnetic reed switch also may cause brief, rapid oscillation of the switch state during normal switch state changes due to presence of a magnet, commonly known as switch bouncing. This switch bouncing occurs for a brief period of time during a normal switch event. Such switch bouncing may occur at a low enough frequency that the handbrake device processor can potentially register transient switch oscillations as a switch state change. These false triggers, whether due to motion, hard impacts, or the mechanical characteristics of the switch during a normal switch event, can lead to inaccurate state determinations, blocking of the device algorithm, or continuous restarts of the device algorithm that do not match the actual operation of the handbrake. A debounce algorithm may take multiple switch state samples at defined time intervals (e.g., every x nanoseconds, milliseconds, etc.) once the handbrake set state is triggered. For each sampling event, the previous switch state, and current switch state may be stored. A data message may be generated only when the current switch state remains constant for multiple samples. In some embodiments, an additional switch state sampling may be recorded after the message is offloaded, up to 30 seconds after the change in state is confirmed.

In addition to collecting the handbrake set and released status, the handbrake remote monitoring device may also measure the GPS position of the railcar. An accelerometer on the device may also determine if the railcar was in a state of motion at the time of the measurement. Reporting from the handbrake monitor may occur on a change in state of the switch or at defined time intervals (e.g., every x seconds, minutes, etc.).

Event Processing and Derived Metrics

Processed data from the remote monitoring server system may be used to generate events that may improve the value of certain business processes. In many embodiments, a car trip completion event may be triggered when the car arrives at destination as measured by the railcar tracker, doors are opened as measured by the door sensor, and the car transitions from the loaded state to the empty state as measured by the load sensor. This car trip completion event may be used by railcar owners, shippers, or railroads to generate automated messages or notifications.

Processing by a remote monitoring server system can allow for far more complex computations and data blending with existing third-party systems. There are several types of systems that can be integrated, such as rail industry systems (EHMS, EWMA, LCM, CLM, CRB/AAR billing, EDI, etc.), car configuration, car health and component history/health history systems, and publicly available datasets, such as the NOAA weather database. EHMS (equipment health monitoring/management system) is designed to provide alerts and assign actionable work orders to both the car owner and repair agencies authorized to complete these running repairs when adverse conditions are measured. The EHMS system is built using fixed position wayside detectors and has had issues with accuracy and consistency in the past. Remote monitoring devices can be used to validate the accuracy and consistency of the wayside detectors. This will provide an independent check on the car performance before, during, and after the wayside detector. Remote monitoring systems can also provide continuous coverage. Whereas cars might only pass the wayside detectors every now and again, continuous monitoring would allow car owners to see if the cars condition is degrading quickly or slowly, and if when it crosses a wayside detector and/or other landmark of interest, whether or not the measurement from the wayside seemed valid. Remote monitoring systems can flag one-off alerts that issue a work order against the car. For example, EHMS flags wheelset number 1 as high impact. The remote monitoring system can analyze the information available and determine if it has been seeing high impacts or escalating impacts on that wheel to try to confirm the alert. If none are found, the alert would be closed as unjustified. If there were a backing to show that the wheels condition has been declining or the high impact was also detected around the detector, the alert would remain open. For example, the hunting performance from the hunting monitor can be compared to the car performance at the particular hunting detector site.

AAR Billing is the term for work completed on a car by a third party that does not need the car owner's permission to perform the repair. For example, if a wheel is bad, preauthorized repair agents can respond to alerts generated by the EHMS system and perform the limited set of work outlined by AAR guidelines. The remote monitoring system can to integrate with this data in order to gain an understanding of when parts were replaced to determine if the performance issues identified where resolved, or if a replacement occurred without a performance issue.

In another example, if a wheel was flagged for High impacts by EHMS, and the remote monitoring system analyzes the sensor monitoring High impacts and check for the next several days or a select mileage (at speed) and validate the high impacts are no longer occurring. If high impacts are still detected, the repair can be marked incomplete or ineffective. The remote monitoring system could then open a new work order to inspect and replace the proper wheelset or parts. The remote monitoring system can also work with billing departments in order to get a refund for incomplete or incorrect repairs.

Remote monitoring systems can also help spot any third party repair agents that are trying to exploit the system by completing repairs that might not have been needed, but are not currently verifiable in today's environment. The remote monitoring system can validate performance issues and see a decline in performance before the part replacement. If the parts condition was still nominal, data to back up a claim that a part or system was functioning properly and any repair done was not warranted can be obtained by the remote monitoring devices. Additionally, the geographic location and time spent at that geographic location using remote monitoring can validate that labor charges and the repairs that were billed by the repair agent were appropriate for that equipment.

CLM (car location messages) from third-party databases can be used to track railcars. These messages can be generated from fixed wayside AEI tag readers. These messages often take some time, such as several hours, to process and reach the end customer. Remote monitoring systems can provide more accurate information about where a car traveled including, which yards it entered, roughly which tracks and switches it travels through in a short amount of time, and even in real time. Remote monitoring systems can to verify the actual mileage traveled, number of starts and stops, and/or average speed between reporting intervals. This will allow for a more accurate view of the railcar's life allowing for better maintenance and reporting to shippers or railroads where the car is currently located. The remote monitoring system can notify repair crews of an inbound train and the order of the cars coming in. It would also be able to notify the repair crews what material is going to be needed, and where the material will be needed. For example, the crews could then stage two wheel sets in the north yard knowing that the train is coming saving 20 minutes of driving with a forklift after the train has already arrived and the crew are trying to find it. The remote monitoring system can also let the crews know the order or importance and prioritize the worse performing cars as of that moment. If two cars need a replacement, the system would rank the performance from the sensors weighting the most recent data the heaviest to ensure immediate problems are resolved quickly. Remote monitoring systems allow crews to better plan out their inventory and work schedules as the trains that frequent given repair locations can actively tell them how many parts are needed within the next week, month, and quarter. Crews would be able to track the location of cars live on demand with a phone or tablet computer, even without internet connection. The remote monitoring system can receive messages from the cars directly when within range of the wireless transmission from the devices. This will ensure that even in the most remote sections of the rail system, users will be able to view the location of railcars superimposed on a map compared to their current location.

Remote monitoring systems can delegate authority to the railcars location. Users will be able to share the active location with authorized users for a given amount of time or until a condition is met. For example, a shipper can be given a link to a webpage that shows the car location on a map. They will continue to receive the latest position on the map until the sensor on the car shows unloaded. Users could request more information superimposed on top of the map including, but not limited to, speed, ride quality index (e.g. a composite metric of impacts and hunting), and estimated time of arrival.

LCM messages are messages sent from a third party database to car owners about the liability ownership of a railcar, such as the railroad pulling the equipment being monitored. Existing systems involve significant processing to clean and validate the ownership filling in gaps and resolving overlapping liability segments.

Remote monitoring systems can be used to determine what parts are on a railcar and what the useful life of the part should be. Remote monitoring systems can measure local environmental conditions, such as weather. The local environmental conditions can be merged with third-party weather information including dew point, humidity, precipitation quantity and type, and any other weather events that might affect the performance or shipment in the railcar. The remote monitoring system can flag cars for inspection that were in a hazardous or high potential for damage weather event. The remote monitoring system can notify shippers that an extreme weather event occurred and the shipments contents should be verified. For example, large forest fires in the path of the railcar, hurricanes, and the like. Humidity data (and any other relevant environmental condition measured by a remote monitoring device) can be used to verify that the humidity and other environmental measures did not exceed given parameters even if an extreme weather event occurs. Weather events can also be considered when determining the root cause of bad performance on a railcar. When cars are seen to experience certain conditions, the remote monitoring system can account for this in the life expectancy of the parts and railcar or future ride quality performance. This can also be used by a remote monitoring system to open a ticket for inspection or replacement of parts. For example, if a railcar was involved in a hurricane, the railcar can be marked for inspection on critical systems to determine if there was water damage on components not already measured with sensors.

Figure 17:
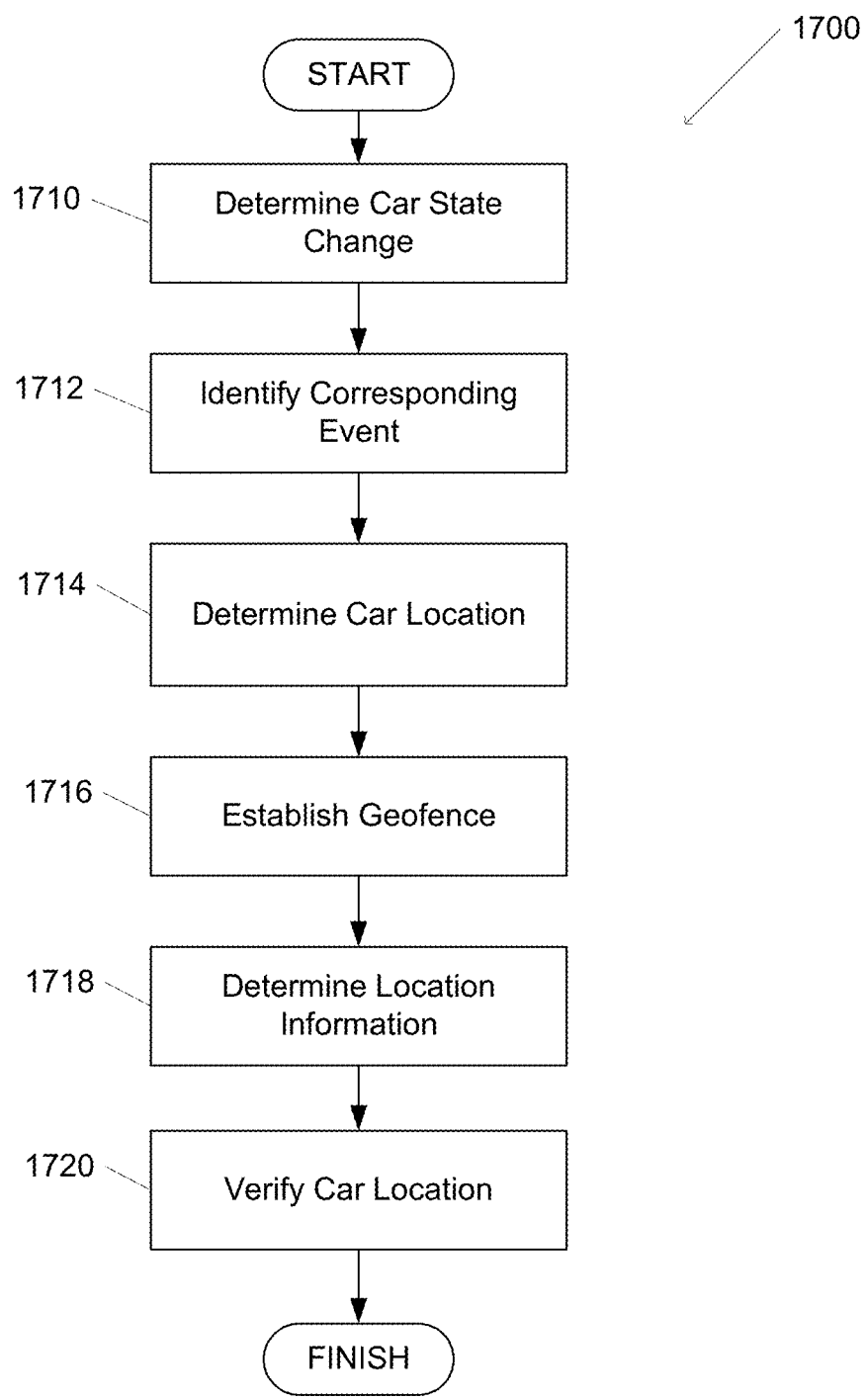
FIG. 17 is a flowchart conceptually illustrating a process for verifying the location of a car in accordance with an embodiment of the invention.

FIG. 17 is a flowchart conceptually illustrating a process for verifying the location of a car in accordance with an embodiment of the invention. Some or all of the steps of process 1700 may be performed using one or more computing devices as described herein. In a variety of embodiments, some or all of the steps described below may be combined and/or divided into sub-steps as appropriate.

At step 1710, a car state change can be determined. The car state change can be determined based on a car load state as described herein. For example, the car state can change from loaded to unloaded and vice versa. In many embodiments, the car state change is associated with an indicated car location and indicates a time at which the car load state change occurred.

At step 1712, a corresponding event can be identified. The corresponding event can indicate a location and the corresponding event location can be associated with the indicated car location. For example, a third party can provide an indication that the car has been loaded or unloaded at the indicated car location. The corresponding event can also indicate an entity name and/or address.

At step 1714, a car location can be determined. In many embodiments, the car location can be determined using a GPS receiver located on the car as described herein. The car location can be determined within a threshold of the time indicated in the car state change. The car location can indicate geographic coordinates (or any other indicator) of the car.

At step 1716, a geofence can be established. The geofence can be centered on the determined car location. The geofence can take any shape, such as a circular area, a square area, and/or any other shape as appropriate. The dimensions of the geofence can be any measurement as appropriate to the location of the car. For example, a smaller geofence can be used in urban areas, while a larger geofence can be used in rural areas. In many embodiments, the geofence is a one-quarter mile square. In a variety of embodiments, one or more sensors can be programed to operate differently based on what geofence they are located. For example, a geofence around a customer site can be used to reprogram a load sensor to reduce the interval for measuring for load state and reporting the load information. In this way, more granular loading information can be generated and obtained when the car is in a location where it is likely to be loaded and unloaded. Similarly, when the car is between customer sites, it is unlikely that the car will be loaded and unloaded so the reporting interval for the load sensor can be reduced to reduce processing demands and improve power efficiency of the device.

At step 1718, location information can be determined. The location information can indicate an address and/or location name. In many embodiments, the location information is determined using a third-party location service that provides addresses and/or location names associated with geographic coordinates. In several embodiments, the third-party location service provides multiple addresses and/or location names. In a variety of embodiments, the address and/or location name being closest to the car location can be used as the address and/or location name.

At step 1720, the car location can be verified. The car location can be verified by comparing the address and/or location name indicated in the location information with the entity name and/or address indicated in the corresponding event. By verifying the car location, activities performed with a car (such as, but not limited to, time loaded or empty, if the car was impacted, handbrake not released, other improper handling, and the like) while the car is under control of the customer can be more accurately determined.

Verifying the car location can also be used to determine if a particular telematics device is located on and paired with the proper car and that the sensor is not malfunctioning or stolen. When the car location and the GPS location differ, either the GPS receiver was associated with the wrong car number and/or or the telematics device is no longer attached to the railcar. This can be used to generate notifications that a telematics device may have been improperly installed and/or stolen.

Figure 18:
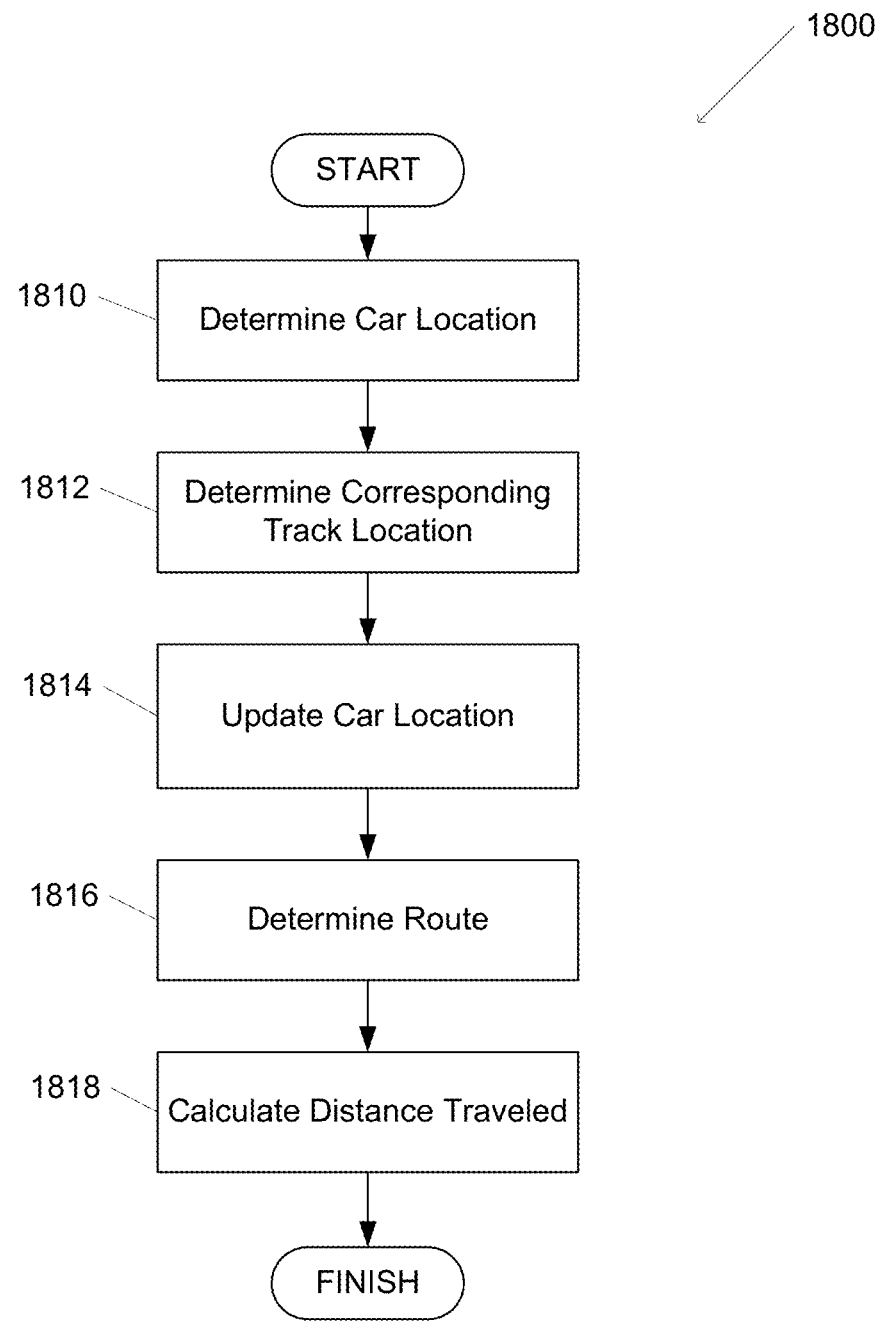
FIG. 18 is a flowchart conceptually illustrating a process for determining a distance traveled in accordance with an embodiment of the invention.

GPS receivers can determine the location of an object with a certain degree of accuracy. However, this location can be affected by the quality of signals received by the GPS receiver and/or the inherent inaccuracy of the GPS system. However, this inaccuracy can often be corrected when determining the location of railcars, as railcars are limited to traveling on tracks with a fixed and known location. FIG. 18 is a flowchart conceptually illustrating a process for determining a distance traveled in accordance with an embodiment of the invention. Some or all of the steps of process 1800 may be performed using one or more computing devices as described herein. In a variety of embodiments, some or all of the steps described below may be combined and/or divided into sub-steps as appropriate.

At step 1810, a car location can be determined. The car location can be determined at a particular time. In many embodiments, the car location is determined using a GPS receiver installed on the car as described herein.

At step 1812, a corresponding track location can be determined. The corresponding track location can be a rail track that is located within a threshold distance of the car location. In many embodiments, multiple rail tracks are located within the threshold distance and the rail track closest to the car location is selected as the corresponding track. The location of the corresponding track can be determined based on a database of rail track locations. For example, the North American Rail Network (NARN) database can be used to determine the location of rail tracks in North America. However, any track database can be used as appropriate.

At step 1814, the car location can be updated. The car location can be updated based on the corresponding track location. In this way, the car location can be updated to follow the route of the rail track as indicated in the rail track location database.

At step 1816, a route can be determined. The route can be determined based on a starting point of the railcar, an ending point of the railcar, and one or more car locations. The starting point of the route can be indicated as a geographic location where the car starts moving, and the ending point of the route can be indicated as the geographic location where the car stops moving. The car locations can be determined at a sampling interval while the car is moving between the starting point and the ending point.

At step 1818, a traveled distance can be calculated. The traveled distance can be calculated based on the start point of the route, the end point of the route, and the length of track between the start point and the end point of the route. For example, the length of track can be determined using the rail track location database.

Figure 19:
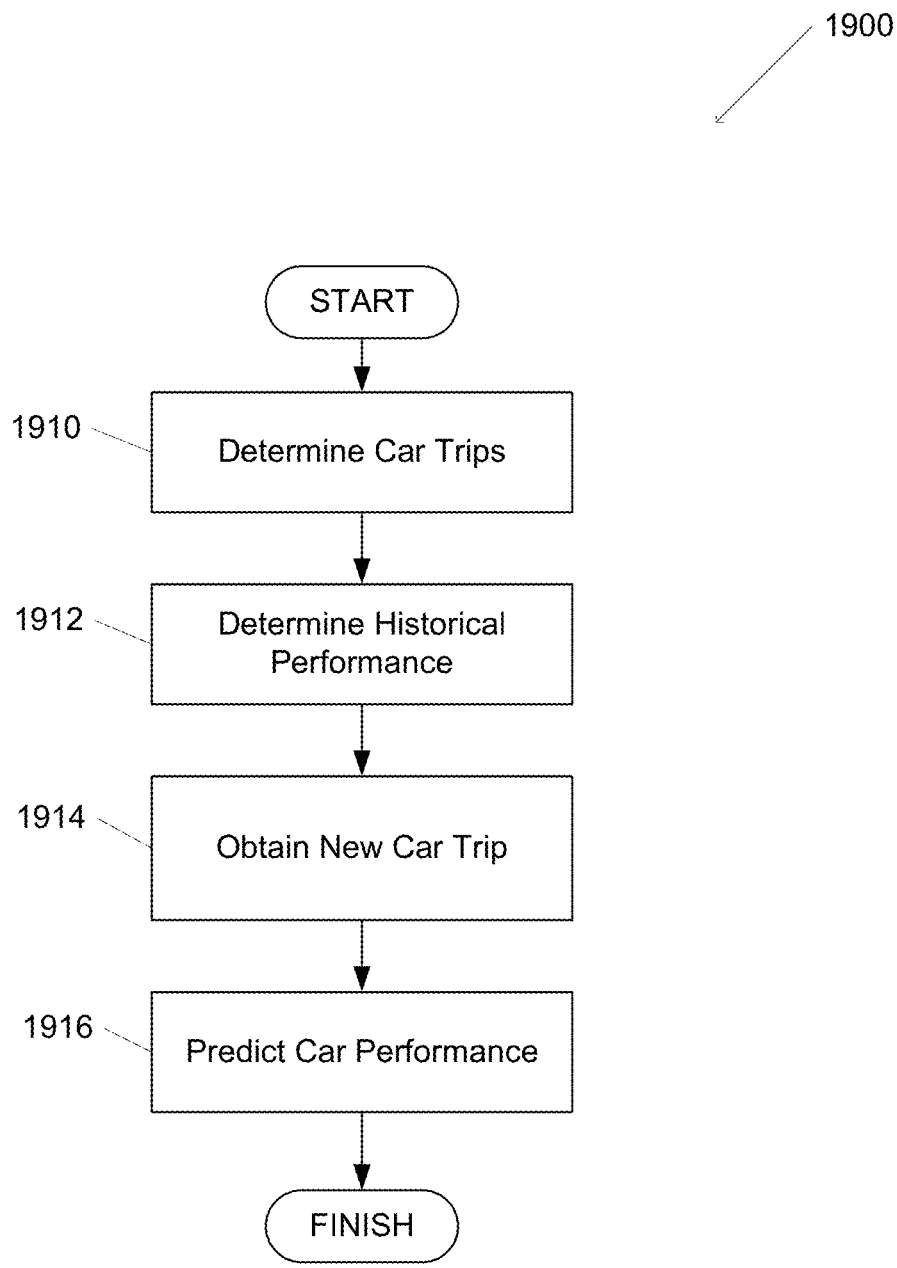
FIG. 19 is a flowchart conceptually illustrating a process for predicting car performance in accordance with an embodiment of the invention.

One advantage of tracking the location and load status of a number of railcars is aggregating trip data across multiple railcars over time. This can include looking at the average traveling speed, stopping locations, and nominal car performance by car type in these locations/environments. The historical car performance can be used to predict the performance of future cars traveling on the same routes. FIG. 19 is a flowchart conceptually illustrating a process for predicting car performance in accordance with an embodiment of the invention. Some or all of the steps of process 1900 may be performed using one or more computing devices as described herein. In a variety of embodiments, some or all of the steps described below may be combined and/or divided into sub-steps as appropriate.

At step 1910, car trips can be determined. The car trips can indicate a route traveled by a car, the time at which the car traveled the route, and/or the total time it took the car to travel the route. The car trips can be determined using any of a variety of processes as described herein.

At step 1912, historical performance data can be obtained. The historical performance data can include the car trips for one or more cars that traveled the route. The historical trips can also include the time at which the car traveled the route as differing weather conditions can affect the total speed at which a car can travel a particular route. For example, a car can travel faster through the mountains in the summer than in the winter when snow and ice can affect the maximum speed and/or times at which the car can travel. The historical performance data can also include any other conditions and/or factors associated with a car trip, such as traffic conditions, stoppage areas, and the like.

At step 1914, a new car trip can be obtained. The new car trip can indicate an intended route to be traveled by a railcar and/or the time at which the railcar will be traveling the route.

At step 1916, car performance can be predicted. The car performance can be predicted based on the historical performance data for the route and/or time indicated in the new car trip. In many embodiments, the car performance is predicted using one or more machine classifiers that generate an estimated travel time for the car and/or a confidence metric indicating the likelihood that the car will traverse the route in the estimated travel time. It should be readily apparent to one having ordinary skill in the art that a variety of machine classifiers can be utilized including (but not limited to) decision trees, k-nearest neighbors, support vector machines (SVM), neural networks (NN), recurrent neural networks (RNN), convolutional neural networks (CNN), probabilistic neural networks (PNN), and transformer-based architectures. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

With sensor data in aggregate, metrics and ratios may be obtained that provide insights into both the operation of the railcar and that mechanical health of monitored components. With the sensor data, the number of load events per month, the number of loads per month can be determined. When combined with data from other sensors, the quantity of braking events while a railcar was loaded versus empty and whether the railcar was moving or stationary can also be determined. These events may be tallied, and an accumulation of these events may be evaluated to better understand the performance of the railcar systems and the health of the monitored systems, components, and the like.

Event severity may be categorized based on whether the railcar was in motion or stationary, in line of road or in a yard, or loaded or empty at the time of the event.

Impacts may be monitored in terms of quantity and magnitude for each trip the railcar takes while loaded. Based on the quantity and magnitude of the impacts, a total amount of impact energy potentially imparted to the lading on the railcar may be calculated. These impacts might be the result of stationary impacts, or in train forces experienced at higher speeds and or braking events. With the addition of the air brake monitor, it may be determined that a rapid braking event or an emergency braking event led to a hard impact due to, e.g., a train encounter.

Railcar component health is another byproduct of combining sensor data. A railcar equipped with various combinations of an air brake monitor, hand brake monitor, impact device, and load monitor may provide data that indicates the impact of operations on wheel life. Although sensors may exist wayside to measure wear after damage has occurred to wheels, the sensors and monitoring devices described herein allow for the tracking of events that may lead to damage on wheels and allow for the tracking of the damage over time providing a date of expected replacement. If a railcar experiences an emergency brake event or has the hand brake engaged while the car is moving, there is a high likelihood wheel damage will occur. Wheelset replacements, or high impact wheel events may be compared to the date the sensor determines the adverse event. A better understanding of how long a wheel survives post adverse event and event severity may be determined. These sensors allow for the better tracking and planning of wheel life and replacements as well as understanding the operational uses of the equipment.

With the addition of the third party data provided by, e.g., industry (Railinc) and the FRA, events may be mapped to tracks and allow for even more explanation of the railcars operational history and accumulated events. This may include speeds through left and right hand curves and whether the brakes were engaged during these curves. Accumulation of events by locations may also be determined. Yards, loading facilities, and storage tracks, for example, may have events accumulated by location to identify areas that induce larger than expected event counts. This may include a yard that has higher than average impact forces, speeds, counts, etc. than other yards. With the outliers being tracked, it may be possible to identify solutions and monitor improvements or declines over time.

Hunting Condition Monitor

Figure 20A:
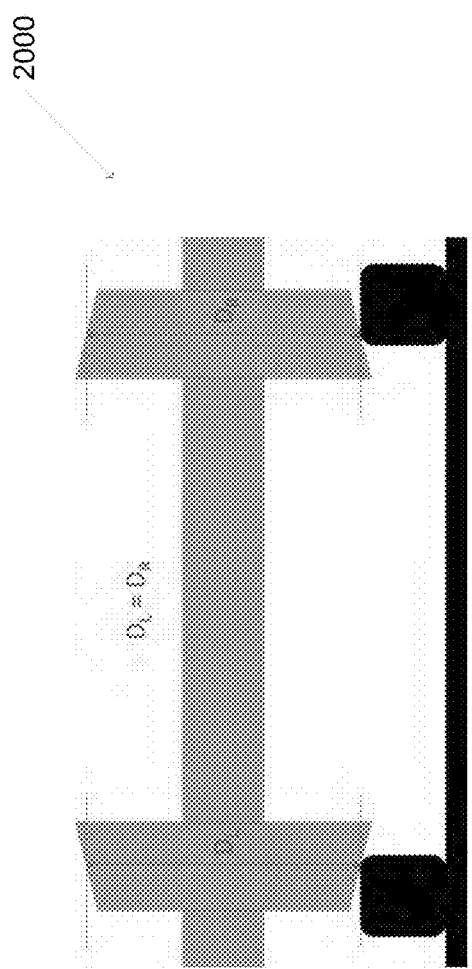
FIGS. 20A-B are conceptual illustrations of wheel alignment in hunting conditions in accordance with an embodiment of the invention.
Figure 20B:
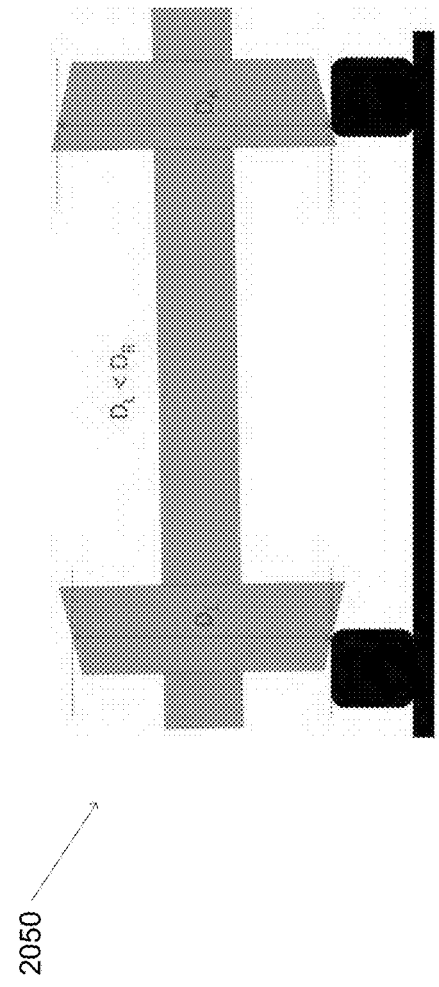

Hunting is an instability phenomenon that may occur as railcars' speed increases. Freight railcars can utilize tapered/conical wheel profiles (as shown in FIG. 20A) to balance curving performance (resistance, wear, etc.) with stability at high speed. In a curve, as shown in FIG. 20B, this conical profile allows a circumferential speed differential between the inside and outside wheel on an axle, due to the outside wheel traveling a greater distance than the inner wheel (due to radius difference of the inside and outside track). On tangent (i.e. straight) track, the axle will continuously "hunt" for an equilibrium condition. For example, minor imperfections in track geometry may induce some lateral or angular offset in the axle relative to the track, and due to gravity and the conical wheel profile, the axle will "hunt" for a new equilibrium condition. Although some lateral oscillation will always exist with amplitude that increases roughly linearly with velocity, railcars tend to exhibit two distinct conditions, one considered stable and another considered unstable. Usually a freight railcar will operate in a stable condition with relatively small oscillation at lower speeds, and at some critical higher speed will change to an unstable condition with relatively larger oscillation. Especially with partially or fully loaded cars, the lateral accelerations and forces experienced may damage the car, the cargo, and/or the track structure.

In some examples, an accelerometer may be configured with a reference frame whereby the y-axis of the reference frame corresponds to the axis that is generally perpendicular to (between) the rail tracks and the railcar's direction of travel, and the x-axis of the reference frame corresponds to the axis that is generally parallel with (along) the rail tracks and the railcar's direction of travel. In these examples, lateral (side-to-side) acceleration of the railcar axle between the rail tracks may be measured by reading the y-axis data from the accelerometer. In other examples, the accelerometer may be configured with a reference frame whereby a different axis (e.g., the x-axis or z-axis) corresponds to the axis perpendicular to the rail tracks. In those examples, lateral acceleration of the railcar axle may be measured by reading the accelerometer data for one of those alternative axes.

To conserve energy, hunting detection processes may utilize condition-based operation, generally capturing, processing, and transmitting the most relevant and useful data depending on the actual operating condition of the railcar in the moment. The hunting algorithm operation is conditional; some steps of the algorithm are excluded under certain conditions. For example, if the GPS speed is below the hunting threshold speed, hunting is extremely unlikely or impossible to occur, so accelerometer data is not polled and statistics calculations are not conducted. The data sent therefore does not include statistical summary data. In the absence of valid GPS data, hunting is still capable of occurring, therefore the algorithm may still check for a hunting condition. In this case, the reported condition will still indicate the invalidity of the GPS data, but will also include the applicable threshold checking results and statistical summary data as necessary. The available conditions can include those discussed below.

GPS Speed not Valid—

In some situations, the GPS module may not be able to measure speed. In these situations, a GPS connection may be poor or unavailable. The monitoring device thus may not poll the GPS location. The value of a transmitted condition variable (C) may depend on results of accelerometer data. Further, the statistical summary data transmitted may depend on whether the running standard deviations ($\sigma_r$) calculated exceeded a hunting threshold standard deviation ($\sigma_t$). For example, if accelerometer data ($a_y$) did not exceed an acceleration threshold ($a_t$) for a defined duration ($t_a$), then the value of the transmitted condition variable may be zero (C=0), and the maximum accelerometer reading ($a_{y,m}$) may be transmitted. As another example, if accelerometer data ($a_y$) did exceed the acceleration threshold ($a_t$) during the defined duration ($t_a$) but none of the calculated running standard deviations ($\sigma_r$) exceeded the hunting threshold standard deviation ($\sigma_t$), then the value of the transmitted condition variable may be one (C=1) and the average of running standard deviations ($\overline{\sigma_{r,n}}$) and the maximum of running standard deviations (arm) may be transmitted. As a further example, if accelerometer data ($a_y$) exceeded the acceleration threshold ($a_t$) during the defined duration ($t_a$) and at least one of the calculated running standard deviations ($\sigma_r$) exceeded the hunting threshold standard deviation ($\sigma_t$), then the value of the transmitted condition variable may be two (C=2), and the average of running standard deviations ($\overline{\sigma_{r,n}}$), maximum of running standard deviations ($\sigma_{r,m}$), and percentage (p) of running standard deviations above the hunting threshold standard deviation ($\sigma_t$) may be transmitted.

GPS Location not Valid—

In some situations, the GPS module may not be able to measure location. The value of the transmitted condition variable (C) may depend on results of accelerometer data. Similar to above, the statistical summary data transmitted may depend on whether the running standard deviations ($\sigma_r$) calculated exceeded a hunting threshold standard deviation ($\sigma_t$). For example, if accelerometer data ($a_y$) did not exceed acceleration threshold ($a_t$) for a defined duration ($t_a$), then the value of the transmitted condition variable may be three (C=3), and the GPS speed (v) and maximum accelerometer reading ($a_{y,m}$) may be transmitted. As another example, if accelerometer data ($a_y$) did exceed the acceleration threshold ($a_t$) was exceeded during the defined duration ($t_a$) but none of the calculated running standard deviations ($\sigma_r$) exceeded the hunting threshold standard deviation $\sigma_t$, then the value of the transmitted condition variable may be four (C=4), and the GPS speed (v), average of running standard deviations ($\overline{\sigma_{r,n}}$), and maximum of running standard deviations ($\sigma_{r,m}$) may be transmitted. As a further example, if accelerometer data ($a_y$) exceeded the acceleration threshold ($a_t$) was exceeded during the defined duration ($t_a$) and at least one of the calculated running standard deviations ($\sigma_r$) exceeded the hunting threshold standard deviation ($\sigma_t$), then the value of the transmitted condition variable may be five (C=5), and the GPS speed (v), average of running standard deviations ($\overline{\sigma_{r,n}}$), maximum of running standard deviations ($\sigma_{r,m}$), and percentage (p) of running standard deviations above the hunting threshold standard deviation ($\sigma_t$) may be transmitted.

Speed Below Threshold—

In some situations, the GPS data may be valid, but the GPS speed (v) did not exceed threshold speed ($v_t$). In these situations, accelerometer data may not be measured. The value of the transmitted condition variable transmitted may be six (C=6), and the GPS speed (v) and GPS latitude and longitude ($L_{lat}$ and $L_{lon}$) may be transmitted.

Acceleration Below Threshold—

In some situations, the GPS speed (v) may exceed a speed threshold ($v_t$), but the accelerometer data ($a_y$) did not exceed acceleration threshold ($a_t$) for the defined duration ($t_a$). The value of the transmitted condition variable may be seven (C=7) and the GPS speed (v), GPS latitude and longitude ($L_{lat}$ and $L_{lon}$), and maximum accelerometer reading ($a_{y,m}$) may be transmitted.

Hunting not Detected—

In some situations, the accelerometer data ($a_y$) may exceed the acceleration threshold ($a_t$) during the defined duration ($t_a$) but none of the calculated running standard deviations ($\sigma_r$) exceeded the hunting threshold standard deviation ($\sigma_t$). The value of the transmitted condition variable transmitted may be eight (C=8) and the GPS speed (v), GPS latitude and longitude ($L_{lat}$ and $L_{lon}$), average of running standard deviations ($\overline{\sigma_{r,n}}$), and maximum of running standard deviations ($\sigma_{r,m}$) may be transmitted.

Hunting Detected—

In some situations, $a_t$ least one of the calculated running standard deviations ($\sigma_r$) may exceed the hunting threshold standard deviation ($\sigma_t$). The value of the transmitted condition variable may be nine (C=9), and the GPS speed (v), GPS latitude and longitude ($L_{lat}$ and $L_{lon}$), average of running standard deviations ($\sigma_{r,n}$), maximum of running standard deviations ($\sigma_{r,m}$), and percentage (p) of running standard deviations above the hunting threshold standard deviation ($\sigma_t$) may be transmitted.

Hunting detection processes can include the use of any of the following constants, thresholds, allocations, and/or variables. The values indicated below are provided by way of example only. Other values may be employed as needed in various implementations.

$a_w$=3 m/s$^2$: The accelerometer should be triggered to wake up above this acceleration. "wake_accel"

$v_t$=45 mph: Above this speed, check accelerometer data. "gps_speed_threshold"

$a_t$=6 m/s$^2$: Above this acceleration, run stats analysis. "accel_threshold"

$a_t$=1.4 m/s$^2$: Running standard deviation above this value is considered "hunting". "stats_threshold"

$t_a$=3000: Maximum duration of comparing accelerometer data to $a_t$, in milliseconds (ms). "buffer_duration"

$t_m$=30000: Total duration of stats accelerometer readings, in ms. "measurement_duration"

$d_{rsd}$=500: Distance of running standard deviation window, in feet.

"running_distance" $t_r$=10: Amount of time between accelerometer readings, in ms. "read_rate"

$t_{rsd,m}$: Duration of running standard deviation, in ms, for memory allocation. "max_running_duration"

$n_d$: Length of data array used for stats calculations. "len_data_array"

D: Data array of size rid used to store accelerometer readings for stats calculations. "data_array" $L_{lat}$: GPS latitude, degrees. "loc_lat" $L_{lon}$: GPS longitude, degrees. "loc_lon"

v: GPS speed, mph. "gps_speed"

$L_{lat,int}$: GPS latitude, as decimal-shifted integer. "loc_lat_int" $L_{lon,int}$: GPS longitude, as decimal-shifted integer. "loc_lon_int"

$v_{int}$: GPS speed, as decimal-shifted integer. "gps_speed_int"

$t_{rsd}$: Duration of running standard deviation, based on $d_{rsd}$ and v, in ms. "running_duration"

$t_s$: Start time of accelerometer comparisons to $a_t$, in ms. "accel_check_start_time"

$a_y$: Latest acceleration reading in y-direction (lateral), in m/s$^2$. "y_accel"

$a_{y,m}$: Maximum acceleration reading in y-direction, in m/s$^2$. "max_accel"

$a_{y,m,int}$: Maximum acceleration reading in y-direction, as decimal-shifted integer. "max_accel_int"

$t_{s,rsd}$: Start time of running standard deviation calculation, in ms. "start_millis"

C: Condition judgement variable. "condition"

$M_o$: Running mean of accelerometer readings, in m/s$^2$, previous value. "M_old"

$M_n$: Running mean of accelerometer readings, in m/s$^2$, latest value. "M_new"

$S_o$: Variance of accelerometer readings times number of readings, in m/s$^2$, previous value. "S_old"

$S_n$: Variance of accelerometer readings times number of readings, in m/s$^2$, latest value. "S_new"

$\sigma_r^2$: Running variance of accelerometer readings, in m/s$^2$, based on $S_n$. "S2"

$\sigma_r$: Running standard deviation of accelerometer readings, in m/s$^2$. "std_dev"

$\overline{\sigma_{r,o}}$: Average of all running standard deviation calculations, in m/s$^2$, previous value. "avg_std_dev_old"

$\overline{\sigma_{r,n}}$: Average of all running standard deviation calculations, in m/s$^2$, latest value. "avg_std_dev_new"

$\overline{\sigma_{r,int}}$: Average of all running standard deviation calculations, in m/s$^2$, as decimal-shifted integer. "avg_std_dev_int"

$\sigma_{r,m}$: Maximum of all running standard deviation calculations, in m/s$^2$. "max_std_dev"

$\sigma_{r,m,int}$: Maximum of all running standard deviation calculations, in m/s$^2$, as decimal-shifted integer. "max_std_dev_int"

$n_s$: Total number of full running standard deviation calculations performed. "stats_counter"

$n_{s,t}$: Number of full running standard deviations that exceeded $\sigma_t$. "stats_thresh_counter"

p: Percentage of full running standard deviations that exceeded $\sigma_t$. "percent"

$p_{int}$: Percentage of full running standard deviations that exceeded $\sigma_t$, as decimal-shifted integer. "percent_int"

n: Current number of samples in data array D. "n"

k: Index variable used for stats calculations. "k"

$k_n$: Next index value, used for stats calculations, representing the index of D with the oldest value. "k_next"

Determining a hunting condition may be based on a "running" standard deviation calculation (also called "windowed" standard deviation) of lateral acceleration of the railcar axle between the rail tracks. The "window" may be a defined duration of accelerometer measurement corresponding to a predefined distance, with the relationship:

$$t_{rsd} = \frac{d_{rsd} \times 681.818}{v}$$

where 681.8182 is a factor to convert distance in feet to time in milliseconds (based on GPS-measured speed (v) in miles per hour).

Dividing the duration of the running standard deviation ($t_{rsd}$) by the sample cycle duration in milliseconds gives the total number of samples on which to perform statistical calculations $$\left(\text{samples may be stored in data array } D \text{ of size } \frac{t_{rsd}}{r_d}\right).$$

For example, if $t_{rsd}$ is 10 seconds (i.e. 10,000 ms), and the sample rate is 100 Hz (i.e. 10 ms/sample), then statistical calculations will be performed on 1,000 samples. Once the total sampling time exceeds $t_{rsd}$, the oldest sample is discarded and the newest sample is included, repeating until $t_m$ has elapsed. Continuing the previous example ($t_{rsd}$=10 s, sample rate 100 Hz), if $t_m$ is 30 seconds, then 3,000 total samples will be measured. After the first 1,000 samples have been collected, the standard deviation is calculated for the first time. With each subsequent sample, the standard deviation is updated after discarding the oldest sample and including the latest sample (in this example, the standard deviation is calculated a total of about 2000 times).

Standard deviation is calculated many times on the full data set D (which contains the latest $$\frac{t_{rsd}}{r_d}$$

number of samples). The maximum value of all of these standard deviation calculations ($\sigma_{r,m}$) is monitored, as well as the average value of all of the standard deviation calculations ($\overline{\sigma_{r,n}}$). Additionally, each time the standard deviation is calculated, it is compared to the hunting threshold standard deviation ($\sigma_t$). If the latest standard deviation ($\sigma_r$) exceeds the hunting threshold standard deviation ($\sigma_t$), then the number ($n_{s,t}$) of full running standard deviations that exceeded the hunting threshold standard deviation ($\sigma_t$) is incremented. After the final data sample (after duration $t_m$ has elapsed), the percentage (p) of full running standard deviations that exceeded the hunting threshold standard deviation ($\sigma_t$) is calculated based on the number ($n_{s,t}$) of full running standard deviations that exceeded the hunting threshold standard deviation ($\sigma_t$) relative to the total number ($n_s$) of full running standard deviation calculations performed as:

$$p = \frac{n_{s,t}}{n_s} \times 100$$

A hunting condition may thus be determined based on whether any of the calculated running standard deviations ($\sigma_r$) exceeded the hunting threshold standard deviation ($\sigma_t$).

In some examples, devices can utilize a timer to set intervals between data transmission cycles. At the end of each data transmission cycle, the device may enter a low-power mode (e.g., a "sleep" mode), which may include powering down the GPS and accelerometer modules, placing a LoRa radio module in a sleep/standby mode, and placing a main microcontroller into a sleep/standby mode (with the timer clock still running). When the timer elapses, the main microcontroller may return to a normal power mode, wakes, or powers on the other modules.

In some examples, a low-power accelerometer module capable of measuring at least one axis (bidirectional) acceleration may be configured to wake from a low-power "sleep" mode when it experiences a lateral acceleration that exceeds threshold wake trigger ($a_w$). When this occurs, the accelerometer module may trigger an interrupt pin on the main microcontroller to begin a hunting detection process (or if the main microcontroller is powered down in place of a low-power mode, the accelerometer trigger should turn on power to the microcontroller). Once it has received the wake interrupt (or been powered on), the main microcontroller should wake or power the GPS module and wait for a GPS lock/fix. Once all of the applicable data collection and processing has completed, the main microcontroller should power-up or wake the cellular module, connect to the network, and transmit data. While the cellular module is powered up, the device should also check for any data received from the network, such as updates to constants (e.g. if acceleration threshold $a_t$ is updated) or firmware updates. Once complete, the main microcontroller should power down or place into sleep mode the cellular module and GPS module, and enter its own sleep mode (or in the case of a fully powered-down microcontroller, it should clear the accelerometer interrupt that controls the main microcontroller power).

Statistical calculation may occur in two stages. In some examples, may occur only if a GPS speed threshold ($v_t$) and an acceleration threshold ($a_t$) are both satisfied (e.g., met or exceeded). First, starting at a start time ($t_{s,rsd}$) of the running standard deviation calculation, the data array D may be iteratively filled with new acceleration data for a duration of running standard deviation ($t_{rsd}$), e.g. in milliseconds. For each new entry into D during this initial buildup, running standard deviation factors may be calculated including a running mean of accelerometer readings (M).rsd and a variance of accelerometer readings times the number of readings (S). Once $t_{rsd}$ milliseconds have elapsed, the running standard deviation of accelerometer readings ($\sigma_r$) is calculated for the first time, representing the standard deviation of the entire data array D. At this point, the average standard deviation ($\overline{\sigma_{r,o}}$) and maximum standard deviation ($\sigma_{r,m}$) are set to this value of Or. A counter ($n_s$) indicating the total number of full running standard deviation calculations that have been performed is then incremented. If the calculated standard deviation ($\sigma_r$) exceeds the hunting threshold standard deviation ($\sigma_t$) then counter ($n_{s,t}$) indicating the number of full running standard deviations that exceeded the hunting threshold standard deviation ($\sigma_t$) is incremented, and then a percentage (p) indicating a percentage of full running standard deviations that exceeded the hunting threshold standard deviation ($\sigma_t$) is calculated. Once D is fully filled after $t_{rsd}$ milliseconds, it is circularly updated by removing the oldest entry and adding the newest entry until measurement duration ($t_m$) has elapsed (since time $t_{s,rsd}$). With each new acceleration sample, the latest standard deviation ($\sigma_r$), average standard deviation ($\overline{\sigma_{r,n}}$), and maximum standard deviations ($\sigma_{r,m}$) are updated, as well as the counters ($n_s$ and $n_{s,t}$), and the percentage (p). FIG. 21 is a table illustrating an example of a circular calculation of standard deviations for hunting detection in accordance with an embodiment of the invention.

During both the initial buildup of the data array D and circular updating of D, an "online" algorithm may be utilized for standard deviation. This algorithm may use a formula which accurately updates the standard deviation of D each time a new acceleration is measured based on only a few variables, rather than calculating the standard deviation by using all elements of D each time. These variables include the previous variance times number of samples of D ($S_o$), the newest element of D (the latest $a_y$), the previous mean ($M_o$) of D, the latest mean (Me) of D, and/or the number of samples in D. The latest mean of D (Me) may be calculated similarly with just a few variables to avoid having to calculate mean using all elements of D each time a new measurement is taken. This calculation of the latest mean ($M_n$) may use the following variables: the previous mean of D ($M_o$) the latest $a_y$, and/or the number of samples in D. Before the running standard deviations ($\sigma_r$) are calculated, the data array D is filled, and the above variables are calculated in order to calculate the standard deviation. The following is an example process for generating the data array:

Initialization
  The data array D starts empty
  $n_s$ and $n_{s,t}$ and $S_o$ are reset to 0
  n is reset to 1
    both D[0] (i.e. the first element of D) and $M_o$ are set to the first acceleration sample $a_y$ which exceeded threshold $a_t$
    $t_{s,rsd}$ is set to the current system time in milliseconds
Buildup
  A "while" loop checks if the current system time is less than $t_{s,rsd}+t_{rsd}$
  Inside the while loop, the first step is to wait for new accelerometer data $a_y$ (which should become available every $t_r$ milliseconds)
  D[n] should be set to $a_y$
  Incorporate the latest $a_y$ into the current value of the mean:

$$M_n = M_o + \frac{a_y - M_o}{n+1}$$

$S_n = S_o + (a_y - M_o) \times (a_y - M_n)$
  $M_o = M_n$
  $S_o = S_n$
  n is incremented by 1
Initial Calculation of Standard Deviation
  Variance $\sigma_r^2$ is calculated/updated by $$\sigma_r^2 = \frac{S_n}{n}$$

Standard deviation $\sigma_r$ is calculated/updated by $$\sigma_r = \frac{S_n}{n}$$

$n_s$ is incremented by 1, i.e. set to 1
If $n_s$ exceeds threshold $\sigma_t$ then counter $n_{s,t}$ is incremented by 1, i.e. set to 1 if appropriate
Percentage p is updated:

$$p = \frac{n_{s,t}}{n_s} \times 100$$

Index k of data array D is initialized to the index of the newest element of D by k=n−1
Average standard deviation $\overline{\sigma_{r,o}}$ and maximum standard deviation $\sigma_{r,m}$ are set to the latest standard deviation
Data Array Circular Updating
  Once the data array D has been filled with data representing duration $t_{rsd}$, the standard deviation is updated by removing the oldest entry from D and updating it with the newest entry until duration $t_m$ has elapsed after $t_{s,rsd}$.
  Once a new accelerometer reading is available, $a_y$ is set to the latest accelerometer reading
  The oldest index $k_n$ of D is set: $k_n=(k+1) \bmod n$
  Latest mean $M_n$ is updated by taking the difference between the newest accelerometer reading $a_y$ and the oldest reading $D[k_n]$, dividing the difference by n, and adding it to the previous mean $M_o$:

$$M_n = M_o + \frac{a_y - D[k_n]}{n}$$

$M_o = M_n$
$S_n = S_o + (a_y + D[k_n] - M_o - M_n) \times (a_y - D[k_n])$
Due to potential computation errors, it is possible for $S_n$ to be a very slightly negative number; if so, the value of $S_n$ should be reset to 0
$S_o = S_n$
$D[k_n] = a_y$ sets the oldest index of data array D to the newest accelerometer data
$k = k_n$ updates the newest index variable to the index that contains the latest data $$\sigma_r^2 = \frac{S_n}{n}$$

calculates the running variance of data array D
$\sigma_r = \sqrt{\sigma_r^2}$ calculates the latest running standard deviation of data array D
$n_s$ is incremented by 1
If $n_s$ exceeds threshold $\sigma_t$ then counter $n_{s,t}$ is incremented by 1
Percentage p is updated:

$$p = \frac{n_{s,t}}{n_s} \times 100$$

Latest average of running standard deviations $\overline{\sigma_{r,n}}$ is updated:

$$\overline{\sigma_{r,n}} = \overline{\sigma_{r,o}} + \frac{\sigma_n - \overline{\sigma_{r,o}}}{n_s}$$

If $\overline{\sigma_{r,n}}$ exceeds threshold $\sigma_t$ then maximum standard deviation $\sigma_{r,m}$ is set to the latest standard deviation $\sigma_r$.
Circular updating algorithm restarts and runs until duration $t_m$ has elapsed after $t_{s,rsd}$ Measurement data from the accelerometer may be filtered via 15 Hz low-pass filter to help highlight the approximately 2 Hz to 4 Hz hunting phenomenon. The filter may utilize a strong cutoff, such as a 4-pole, 24 dB/octave, etc. The filter may be implemented using one or more of hardware, an accelerometer with built-in software, or a microcontroller with software. Further, like the impact monitor discussed above, a hunting monitor may also define and reset an appropriate reference frame for the accelerometer of a hunting monitor after the hunting monitor completes a data collection, processing, and transmission algorithm completes a cycle. The reference frame for an accelerometer of a hunting monitor may be reset as described above.

Figure 24:
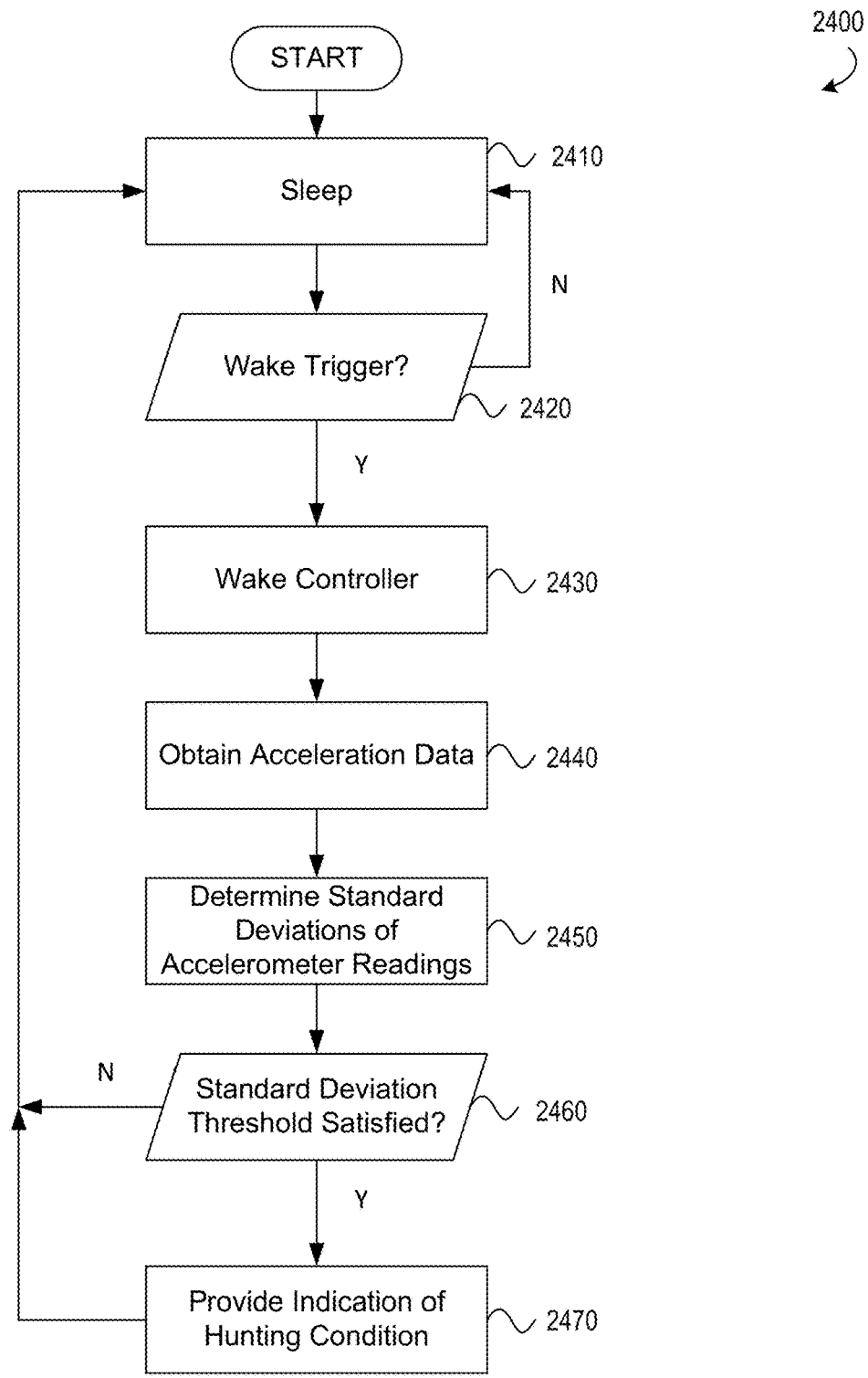
FIG. 24 is a flowchart conceptually illustrating a process for detecting that a railcar axle is in a hunting condition in accordance with an embodiment of the invention.

FIG. 24 is a flowchart conceptually illustrating a process for detecting that a railcar axle is in a hunting condition. Some or all of the steps of process 2400 may be performed using one or more computing devices as described herein. In a variety of embodiments, some or all of the steps described below may be combined and/or divided into sub-steps as appropriate.

At steps 2410 and 2420, a hunting monitor may sleep until a wake trigger is detected. As described herein, a wake trigger may include an accelerometer of the hunting monitor experiencing a lateral acceleration that satisfies (e.g., meets or exceeds) an acceleration threshold. Other wake triggers may include, for example, a speed of the railcar satisfying a speed threshold or expiration of a timer.

At steps 2430 and 2440, based on detecting the wake trigger, the hunting monitor may wake (e.g., from a low-power mode or a powered-off state) and being obtaining acceleration data from an accelerometer. The hunting monitor may obtain the acceleration data from the accelerometer as described above. For example, the acceleration data obtained may include multiple accelerometer readings. The acceleration data obtained (e.g., the accelerometer readings) may be stored in a data array as described above.

At step 2450, the hunting monitor may determine multiple standard deviations of accelerometer readings using the acceleration data obtained. The standard deviations of accelerometer readings may be determined as described above. For example, the first standard deviation determined may be based on the first x number (e.g., 1,000) of accelerometer readings obtained. Thereafter, a new standard deviation may be obtained for each new accelerometer reading obtained from the accelerometer as described above.

At steps 2460 and 2470, the standard deviations of accelerometer readings may be compared to a standard deviation threshold and, if one or more of the standard deviations obtained satisfy (e.g., meet or exceed) a standard deviation threshold, then an indication that an axle of the railcar is in a hunting condition may be provided. The indication of the hunting condition may be provided as described above. After the hunting monitor provides the indication of the hunting condition, or if none of the standard deviations obtained satisfy the standard deviation threshold, the hunting monitor may return to its "sleep" mode until the next wake trigger is detected. The hunting monitor may also provide summary data associated with movement of the railcar (e.g., speed, location) which may include statistical summary data for the standard deviations of accelerometer readings (e.g., average, maximum, percentage that satisfied the standard deviation threshold) as described above. As also described above, various combinations of summary data may be provided depending on, e.g., whether a speed or location of the railcar is available, whether a speed of the railcar satisfied a speed threshold, an acceleration of the railcar satisfied an acceleration threshold for a defined duration, and/or whether any of the standard deviations of accelerometer readings obtained satisfied the standard deviation threshold.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled or interpreted for execution and/or be written in a markup (or otherwise human-readable) language such as (but not limited to) HTML and XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied, in whole or in part, in firmware or hardware equivalents such as integrated circuits, field programmable gate arrays (FPGA), and the like. Particular data structures can be used to implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described herein can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It can be evident to the annotator skilled in the art to freely combine several or all of the embodiments discussed here as deemed suitable for a specific application of the invention. Throughout this disclosure, terms like "advantageous," "exemplary" or "preferred" indicate elements or dimensions which are particularly suitable (but not essential) to the invention or an embodiment thereof, and can be modified wherever deemed suitable by the skilled annotator, except where expressly required. Accordingly, the scope of the invention should be determined not by the embodiments illustrated, but by the appended claims and their equivalents.

What is claimed is:

1. A computing device associated with a rail car, the computing device comprising:
   a time of flight sensor;
   a time of flight signal emitter;
   a processor; and
   a memory storing instructions that, when read by the processor, cause the computing device to:
      send, using the time of flight signal emitter, a pulsed time of flight signal;
      determine, using the time of flight sensor and based on a reflection of the pulsed time of flight signal being in phase with the pulsed time of flight signal, that the reflection is a genuine signal;
      determine, using the time of flight sensor and based on the reflection, a time of flight reading of a spring associated with the rail car;
      compare the time of flight reading with a calculated spring value;
      determine, based on the comparing, a spring height;
      determine, based on spring usage data, an expected height value for the spring, wherein the expected height value corrects for fatigue of the spring; and
      determine, based on the spring height and the expected height value, a load for the rail car.

2. The computing device of claim 1, wherein the instructions, when read by the processor, further cause the computing device to determine a location a location of the rail car based on a global positioning system coordinate associated with the time of flight reading.

3. The computing device of claim 1, wherein the instructions, when read by the processor, further cause the computing device to:
   determine an ambient light reading associated with the rail car; and
   determine a door opening based on the ambient light reading.

4. The computing device of claim 3, wherein the instructions, when read by the processor, further cause the computing device to determine, based on the load and the door opening, a delivery event associated with the rail car.

5. The computing device of claim 1, wherein the spring usage data comprises at least one of:
   previous car load data,
   lifetime spring compression data,
   car travel distance data, or
   spring deformity data.

6. The computing device of claim 1, wherein the instructions, when read by the processor, further cause the computing device to determine the spring height by comparing, based on the time of flight reading, a tare state of the spring with a load level of the spring.

7. The computing device of claim 1, wherein the instructions, when read by the processor, further cause the computing device to:
   determine an additional time of flight reading associated with a door for the rail car; and
   determine the door opening based on the additional time of flight reading.

8. A computer-implemented method for detecting a rail car event, comprising:
   sending, using a time of flight signal emitter, a pulsed time of flight signal;

determining, using a time of flight sensor and based on a reflection of the pulsed time of flight signal being in phase with the pulsed time of flight signal, that the reflection is a genuine signal;

determining, using the time of flight sensor and based on the reflection, a time of flight reading of a spring associated with the rail car;

comparing the time of flight reading with a calculated spring value;

determining, based on the comparing, a spring height;

determining, based on spring usage data, an expected height value for the spring, wherein the expected height value corrects for fatigue of the spring; and determining, based on the spring height and the expected spring height value, a load for the rail car.

9. The computer-implemented method of claim 8, further comprising determining a location a location of the rail car based on a global positioning system coordinate associated with the time of flight reading.

10. The computer-implemented method of claim 8, further comprising:
   determining an ambient light reading associated with the rail car; and
   determining a door opening based on the ambient light reading.

11. The computer-implemented method of claim 10, further comprising determining, based on the load and the door opening, a delivery event associated with the rail car.

12. The computer-implemented method of claim 8, wherein the spring usage data comprises at least one of:
   previous car load data,
   lifetime spring compression data,
   car travel distance data, or
   spring deformity data.

13. The computer-implemented method of claim 8, wherein the determining the spring height comprises comparing, based on the time of flight reading, a tare state of the spring with a load level of the spring.

14. The computer-implemented method of claim 8, further comprising:
   determining an additional time of flight reading associated with a door for the rail car; and
   determining the door opening based on the additional time of flight reading.

15. A non-transitory machine-readable medium storing instructions that, when executed by one or more processors, cause the one or more processors to perform steps comprising:

determining, based on a reflection of a pulsed time of flight signal being in phase with the pulsed time of flight signal, that the reflection is a genuine time of flight signal;

determining, using a sensor comprising a time of flight sensor and based on the reflection, a time of flight reading of a spring associated with a rail car;

determining, based on the sensor, an ambient light reading associated with the rail car;

determining a door opening based on the ambient light reading;

comparing the time of flight reading with a calculated spring value;

determining, based on the comparing, a spring height;

determining, based on spring usage data, an expected height value for the spring, wherein the expected height value corrects for fatigue of the spring; and determining, based on the spring height and the expected spring height, a load for the rail car.

16. The non-transitory machine-readable medium of claim 15, wherein the instructions, when executed by the one or more processors, cause the one or more processors to further perform steps comprising:
   determining a location a location of the rail car based on a global positioning system coordinate associated with the time of flight reading.

17. The non-transitory machine-readable medium of claim 15, wherein the time of flight reading and the ambient light reading are determined using the same hardware.

18. The non-transitory machine-readable medium of claim 15, wherein the spring usage data comprises at least one of:
   previous car load data,
   lifetime spring compression data,
   car travel distance data, or
   spring deformity data.

19. The non-transitory machine-readable medium of claim 15, wherein the instructions, when executed by the one or more processors, cause the one or more processors to further perform determining the spring height by comparing, based on the time of flight reading, a tare state of the spring with a load level of the spring.

20. The non-transitory machine-readable medium of claim 15, wherein the instructions, when executed by the one or more processors, cause the one or more processors to further perform steps comprising:
   determining an additional ambient light reading associated with a door for the rail car; and
   determining the door opening based on the additional ambient light reading.

* * * * *